(12) United States Patent
Hoang et al.

(10) Patent No.: US 12,133,269 B2
(45) Date of Patent: Oct. 29, 2024

(54) METHODS, APPARATUSES AND SYSTEMS DIRECTED TO NETWORK ACCESS FOR NON-TERRESTRIAL NETWORKS

(71) Applicant: InterDigital Patent Holdings, Inc., Wilmington, DE (US)

(72) Inventors: Tuong Hoang, Montreal (CA); Seyed Mohsen Hosseinian, San Diego, CA (US); Mahmoud Taherzadeh Boroujeni, San Diego, CA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 519 days.

(21) Appl. No.: 17/442,316

(22) PCT Filed: Mar. 27, 2020

(86) PCT No.: PCT/US2020/025438
§ 371 (c)(1),
(2) Date: Sep. 23, 2021

(87) PCT Pub. No.: WO2020/198671
PCT Pub. Date: Oct. 1, 2020

(65) Prior Publication Data
US 2022/0159741 A1 May 19, 2022

Related U.S. Application Data

(60) Provisional application No. 62/824,662, filed on Mar. 27, 2019, provisional application No. 62/841,006, (Continued)

(51) Int. Cl.
*H04W 74/08* (2024.01)
*H04L 5/00* (2006.01)
(Continued)

(52) U.S. Cl.
CPC ....... *H04W 74/0841* (2013.01); *H04L 5/0012* (2013.01); *H04W 72/02* (2013.01);
(Continued)

(58) Field of Classification Search
CPC ............. H04W 74/0841; H04W 72/02; H04W 72/0453; H04W 74/0866; H04W 84/06; H04W 74/08; H04L 5/0012
See application file for complete search history.

(56) References Cited

U.S. PATENT DOCUMENTS 11,653,350 B2 * 5/2023 Wang ................ H04W 72/1268
370/329
2016/0295609 A1 10/2016 Vajapeyam et al.
(Continued)

FOREIGN PATENT DOCUMENTS

| CN | 107432042 A | 12/2017 |
|---|---|---|
| CN | 108886673 A | 11/2018 |
| CN | 108934192 A | 12/2018 |

OTHER PUBLICATIONS

Qualcomm Incorporated, Uplink aspects of TDD, 3GPP TSG RAM WG1#92b, R1-1804930, Apr. 7, 2018, 4 pages.
(Continued)

*Primary Examiner* — Hoang-Chuong Q Vu
(74) *Attorney, Agent, or Firm* — Majid Albassam

(57) ABSTRACT

Methods, apparatuses, systems, etc. for, and/or for use in connection with, performing initial access in a non-terrestrial network (NTN) of a communications system. Among such methods is a method that may be implemented in a wireless transmit/receive unit (WTRU) and may include any of receiving, from the NTN, differential delay information and physical random access channel (PRACH) configuration information indicating a set of preambles and a PRACH occasions configuration; determining a set of candidate PRACH occasions, from among a plurality of PRACH
(Continued)

occasions of the PRACH occasion configuration, based on the differential delay information; selecting a preamble from a group of the preambles allocated to one candidate PRACH occasion of the set of candidate PRACH occasions; and transmitting the selected preamble using a PRACH resource corresponding to the one candidate PRACH occasion.

20 Claims, 14 Drawing Sheets

Related U.S. Application Data filed on Apr. 30, 2019, provisional application No. 62/886,320, filed on Aug. 13, 2019.

(51) Int. Cl.
*H04W 72/02* (2009.01)
*H04W 72/04* (2023.01)
*H04W 72/0453* (2023.01)
*H04W 74/0833* (2024.01)
*H04W 84/06* (2009.01)

(52) U.S. Cl.
CPC ... *H04W 72/0453* (2013.01); *H04W 74/0866* (2013.01); *H04W 84/06* (2013.01)

(56) References Cited

U.S. PATENT DOCUMENTS

| | | | |
|---|---|---|---|
| 2019/0029017 A1 | 1/2019 | Chen et al. | |
| 2019/0037421 A1 | 1/2019 | Eyuboglu et al. | |
| 2019/0069322 A1 | 2/2019 | Davydov et al. | |
| 2019/0313456 A1 | 10/2019 | Liu et al. | |
| 2020/0267772 A1* | 8/2020 | Jung | H04W 74/004 |
| 2022/0015120 A1* | 1/2022 | Qiu | H04W 72/1268 |
| 2022/0086786 A1* | 3/2022 | Narasimha | H04W 74/0833 |
| 2022/0225424 A1* | 7/2022 | Wang | H04L 43/0864 |
| 2022/0272765 A1* | 8/2022 | Xu | H04W 74/0833 |
| 2022/0304068 A1* | 9/2022 | Yang | H04W 74/006 |
| 2022/0304076 A1* | 9/2022 | Wang | H04W 72/02 |
| 2022/0330347 A1* | 10/2022 | You | H04B 7/18513 |
| 2022/0346158 A1* | 10/2022 | Xu | H04W 56/0045 |
| 2023/0012036 A1* | 1/2023 | Zhang | H04W 56/0035 |

OTHER PUBLICATIONS

Ericsson, Tracking area management and update for NTN LEO, 3GPP TSGRAN WG2#105 R2-1900544, 3GPP, Feb. 14, 2019, 7 pages.

Huawei, HiSilicon, Overview of NTN, 3GPP TSG RAN WG1#96 R1-1903195, 3GPP, Feb. 16, 2019, 5 pages.

Huawei, HiSilicon, Discussion on timing issues in random access for NTN, 3GPP TSG RAN WG1#96 R1-1903199, 3GPP. Feb. 16, 2019, 7 pages.

ZTE, "Summary of 7.2.1.1 Channel Structure for Two-step RACH", 3GPP Tdoc R1-1903435, 3GPP TSG RAN WG1 #96, Athens, Greece, Feb. 25-Mar. 1, 2019, 28 pages.

Third Generation Partnership Project, "Technical Specification Group Radio Access Network; Study on New Radio (NR) to support non terrestrial networks (Release 15)," 3GPP TR 38.811 V15.0.0 (Jun. 2018).

3rd Generation Partnership Project; Technical Specification Group Radio Access Network; Study on New Radio (NR) to support non terrestrial networks (Release 15), 3GPP TR 38.811 V15.0.0, Jun. 2018, 118 pages.

\* cited by examiner

METHODS, APPARATUSES AND SYSTEMS DIRECTED TO NETWORK ACCESS FOR NON-TERRESTRIAL NETWORKS

CROSS REFERENCE TO RELATED APPLICATIONS

This application is a National Stage entry under 35 U.S.C. § 371 of Patent Cooperation Treaty Application PCT/US2020/025438, filed 27 Mar. 2020 and claims the benefit of (i) U.S. Provisional Application No. 62/824,662, filed 27 Mar. 2019, (ii) U.S. Provisional Application No. 62/841,006 filed 30 Apr. 2019, and (iii) U.S. Provisional Application No. 62/886,320 filed 13 Aug. 2019; the contents of each of which are incorporated by reference herein.

BACKGROUND

The present disclosure relates to network communications, including, but not exclusively, to methods, apparatuses, systems, etc. directed to network access for non-terrestrial networks.

BRIEF DESCRIPTION OF THE DRAWINGS

A more detailed understanding may be had from the following description, given by way of example in conjunction with the accompanying drawings. Figures in such drawings, like the detailed description, are examples. As such, the Figures and the detailed description are not to be considered limiting, and other equally effective examples are possible and likely. Furthermore, like reference numerals in the figures indicate like elements, and wherein.

DETAILED DESCRIPTION

Although various embodiments are described and/or claimed herein in which an apparatus, system, device, etc. and/or any element thereof carries out an operation, process, algorithm, function, etc. and/or any portion thereof, it is be understood that any embodiments described and/or claimed herein assume that any apparatus, system, device, etc. and/or any element thereof is configured to carry out any operation, process, algorithm, function, etc. and/or any portion thereof.

Example Communications Networks

Figure 1A:
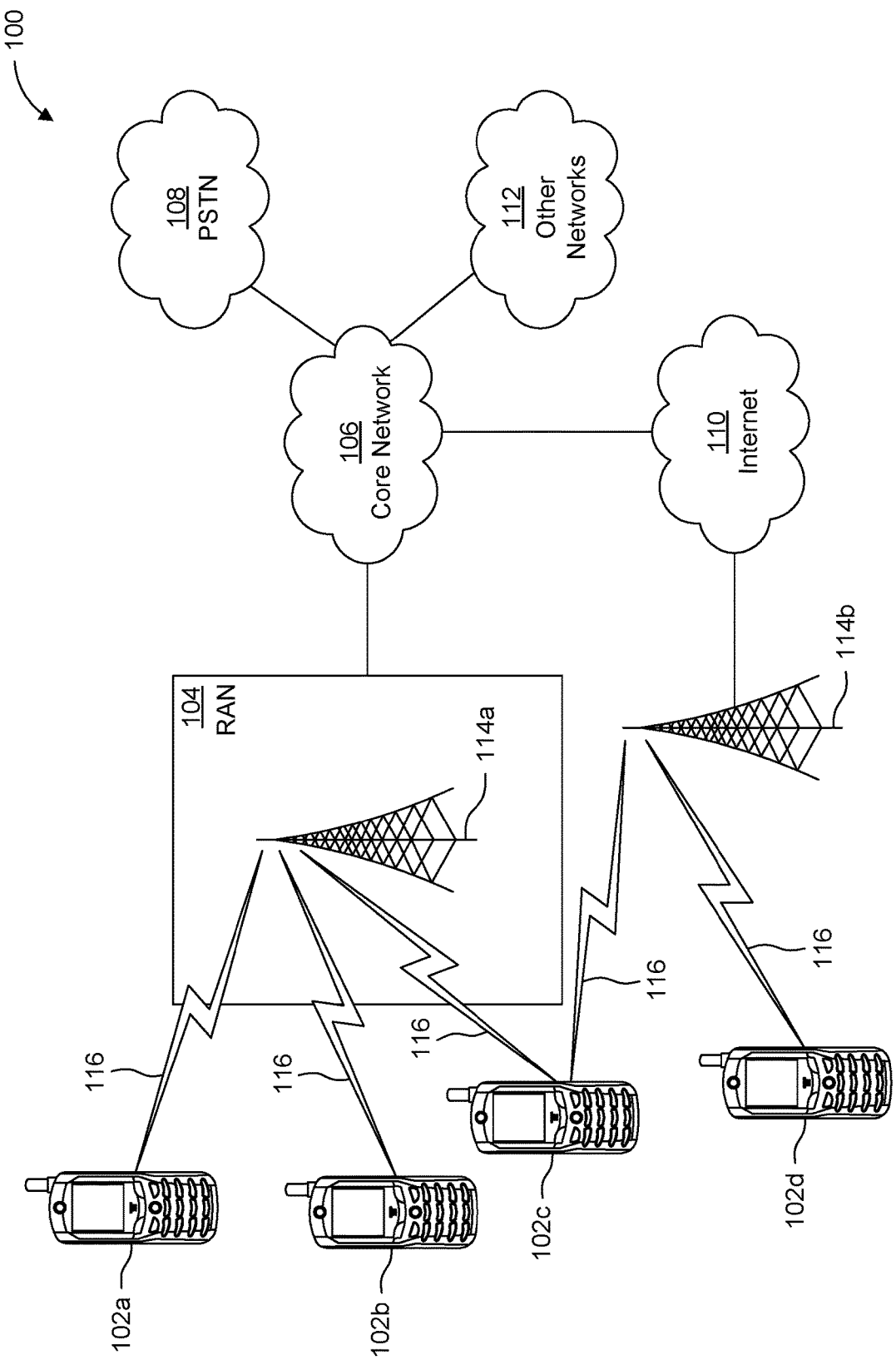
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications system 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VOIP) services to one or more of the WTRUs 102a, 102b, 102c, 102d. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers.

For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
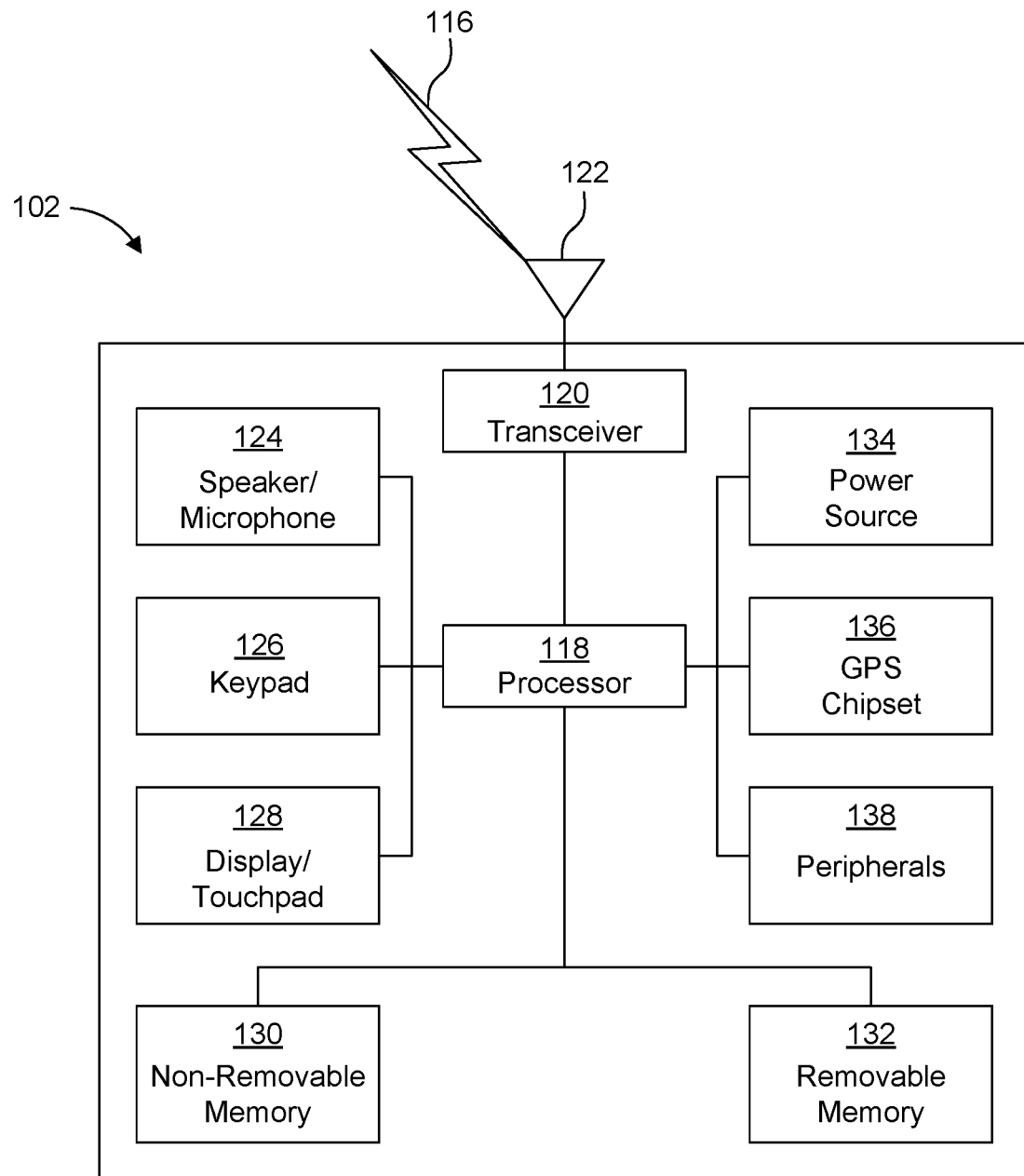
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
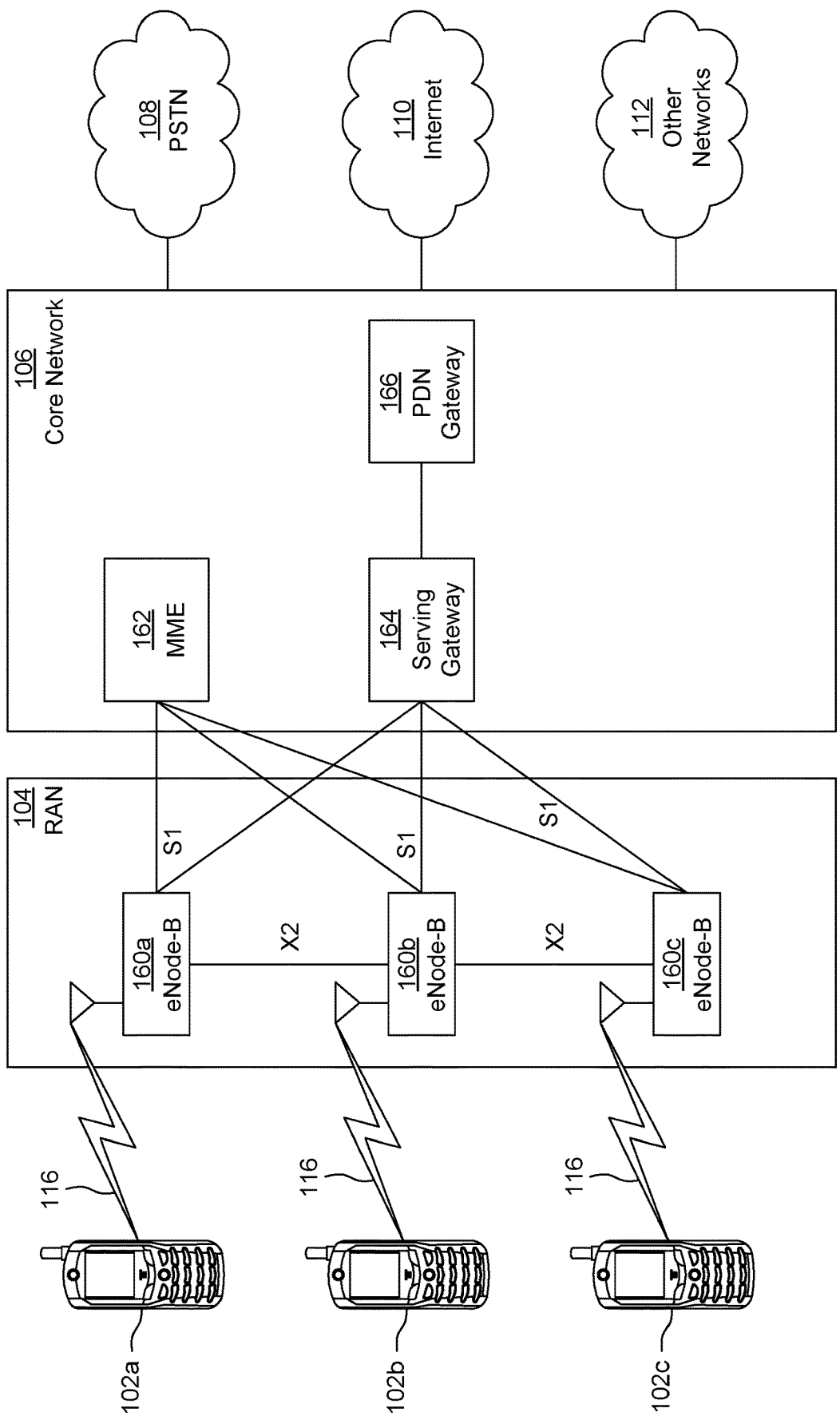
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the cNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the cNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated in certain representative embodiments that such a terminal may use (e.g., temporarily or permanently) wired communication interfaces with the communication network. In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHZ, 80 MHZ, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHZ., 2 MHZ, 4 MHZ, 8 MHZ, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHZ, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country.

Figure 1D:
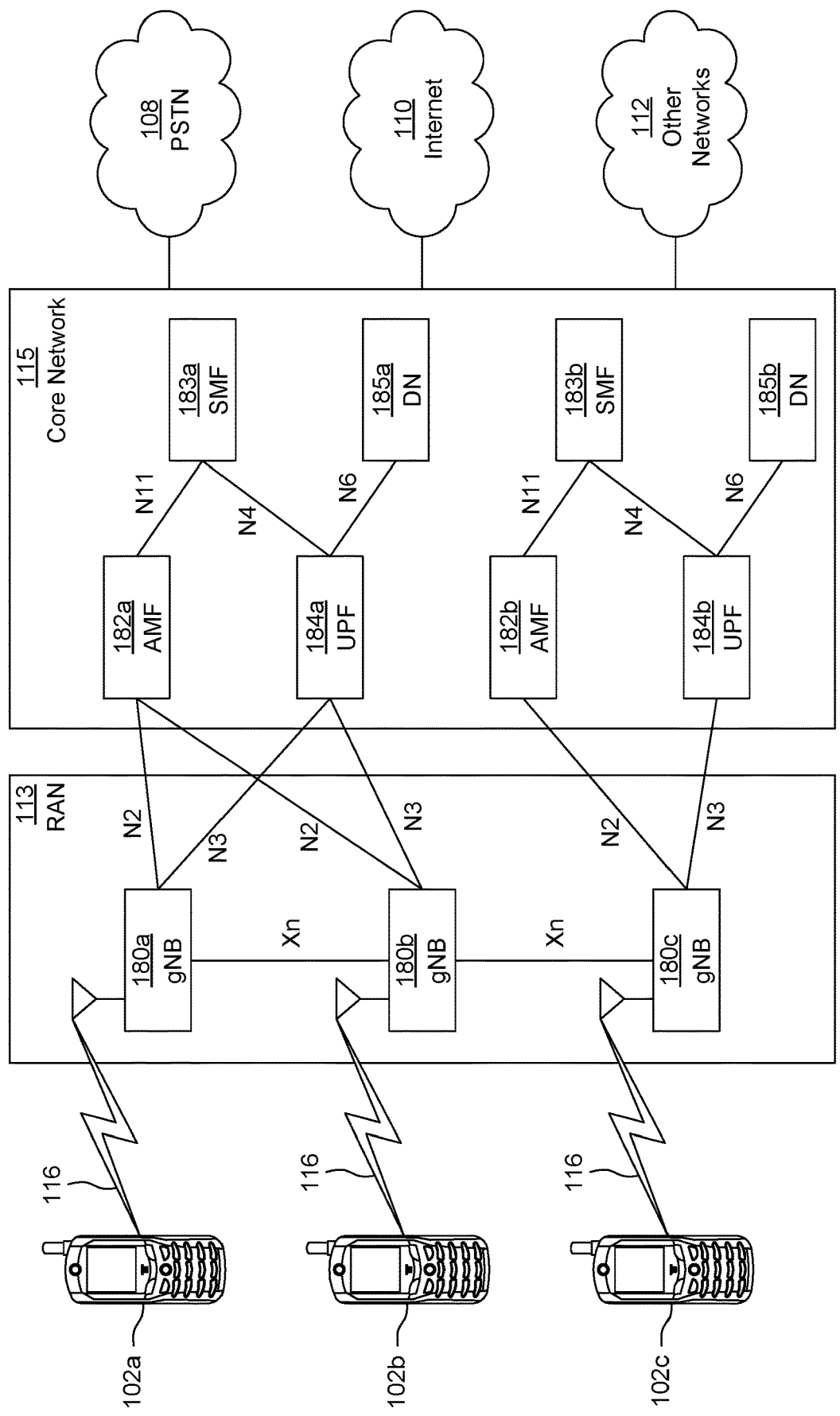
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 180b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized. For example, different network slices may be established for different use cases such as services relying on ultra-reliable low latency (URLLC) access, services relying on enhanced massive mobile broadband (eMBB) access, services for machine type communication (MTC) access, and/or the like. The AMF 182 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184a, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Next generation air interfaces include further evolution of long-term evolution (LTE) Advanced Pro and New Radio (NR). They support a wide range of use cases with varying service requirements (e.g. low overhead low data rate power efficient services (massive machine type communications (mMTC)), ultra-reliable low latency communications (URLLC) services and high data rate mobile broadband services (enhanced Mobile Broadband (eMBB))), for diverse wireless transmit/receive unit (WTRU) capabilities (low power low bandwidth WTRUs, WTRUs capable of very wide bandwidth e.g., 80 MHz, WTRUs support for high frequencies e.g. >6 GHz etc.), under various mobility scenarios (e.g. stationary/fixed, high speed trains etc.). They use an architecture that is flexible enough to adapt to diverse deployment scenarios (e.g. standalone, non-standalone with assistance from a different air interface, centralized, virtualized, distributed over ideal/non-ideal backhaul etc.).

Beamforming may be used to compensate for increased pathloss at higher frequencies (e.g. >6 GHz). A plurality of antenna elements may be used to achieve higher beamforming gain. Analog and/or hybrid beamforming may be used to reduce implementation cost (e.g., reduce the number of radio front end (RF) chains). Analog/hybrid beams may be multiplexed in time, and beam sweeping may be used in NR (e.g., to cover a wide range of areas). During an initial access procedure, the WTRU may (e.g., may need to) monitor multiple downlink reference signals to identify an appropriate beam to access the network.

Non-Terrestrial Networks (NTN) are considered in 3GPP TS 38.811: "Study on New Radio (NR) to support non-terrestrial networks", V15.0.0. They may foster roll out of 5G services in unserved areas (e.g. isolated remote areas, rural areas, vessels in ocean etc.). NTN may be used to upgrade the performance of terrestrial networks in underserved areas in cost efficient manner. NTN may be used to reinforce 5G service reliability, ensure service availability and provide scalability for 5G deployments.

Methods, apparatuses, systems, etc. directed to any of initial and other network access in a combined terrestrial and non-terrestrial network (NTN) (collectively "network") are disclosed herein.

Among such methods are methods directed to PRACH occasion/resource ambiguity avoidance during network access procedures, including ambiguity avoidance between a PRACH occasion/resource used by a wireless transmit/receive unit (WTRU) and the network determination of such PRACH occasion/resource. Such methods, for example, may handle (or address) uncertainties that might otherwise arise during network access.

In various embodiments, methods for, and/or for use in connection with, performing initial or other network access to the NTN may be implemented in a WTRU and may include any of the following.

In various embodiments, methods for, and/or for use in connection with, performing initial or other network access to the NTN may be implemented in a WTRU and may include any of generating a preamble message ("Msg1"); transmitting Msg1 to the NTN; receiving a response message ("Msg2") from the NTN; generating a connection request message ("Msg3"); transmitting Msg3 to the NTN; and receiving a contention resolution message ("Msg4") from the NTN. In various embodiments, Msg1 and Msg3 may be transmitted together (e.g., combined and transmitted) in a message ("MsgA"). In various embodiments, Msg2 and Msg4 (e.g., a combination thereof) may be received together in a message ("MsgB").

In various embodiments, the methods may include receiving a timing offset of the NTN. In various embodiments, the methods may include determining downlink (DL) transmission timing of the network based on a timing offset. In various embodiments, the methods may include sending time advance (TA) information in Msg1.

In various embodiments, the methods may include selecting a physical random access channel (PRACH) configuration to transmit Msg1. In various embodiments, the methods may include selecting a PRACH preamble group from a set of PRACH preamble groups corresponding to different ranges of TA between the WTRU and the network. In various embodiments, the methods may include determining a number of preamble groups based on a number of PRACH resources within a delay difference period. In various embodiments, the methods may include selecting a PRACH preamble group based on a delay difference period and on an SSB. In various embodiments, the methods may include selecting at least one frequency resource to transmit Msg1 based on a PRACH transmission time within a delay difference period. In various embodiments, the methods may include determining a delay difference period. In various embodiments, the methods may include selecting a PRACH preamble group based on a location of a PRACH resource and an associated synchronization signal block (SSB). In various embodiments, the methods may include performing a Doppler compensation. In various embodiments, the methods may include performing a Doppler compensation based on a speed vector. In various embodiments, the methods may include determining a random access-radio network temporary identifier (RA-RNTI) based on a (e.g., selected) PRACH configuration.

In various embodiments, the methods may include determining an initial frame for time indexing and/or for determining RA-RNTI. In various embodiments, the methods may include determining a time index for a PRACH time instance. In various embodiments, the methods may include adjusting a transmit power of Msg1. In various embodiments, the methods may include decoding Msg2 by using one or more RA-RNTI determined within a delay difference period.

In various embodiments, the methods may include any of determining a RACH configuration for transmitting any of Msg1, Msg3 and MsgA. In various embodiments, the methods may include determining a RACH configuration for transmitting any of Msg1, Msg3 and MsgA based on one or more factors. In various embodiments, the one or more factors may include any of (i) a type of WTRU, (ii) a class of WTRU, (iii) whether the WTRU is equipped with GNSS capabilities, (iv) a capability of estimating a timing advance (TA), (v) a capability of estimating a position, (vi) a Doppler compensation capability, (vii) sizes of Msg1, Msg2 and/or MsgA, (viii) an estimated TA, and (ix) a predicted TA.

In various embodiments, the methods may include selecting one or more parameters for the RACH configuration. In various embodiments, the one or more parameters may include any of (i) a preamble index, (ii) a resource for preamble transmission, (iii) a number of preamble transmissions, (iv) a resource for PUSCH, (v) a number of PUSCH transmissions, (vi) a redundancy version (RV) sequence, (vii) an association between a preamble and a PUSCH, (viii) a transmission power of a PUSCH, and (ix) a modulation and/or coding scheme (MCS) of a PUSCH. In various embodiments, the methods may include configuring the WTRU with the one or more parameters. In various embodiments, the methods may include receiving the one or more parameters from the NTN.

In various embodiments, determining the RACH configuration for transmitting any of Msg1, Msg3 and MsgA may include determining a number of PUSCHs and/or a number preamble transmissions based on an estimated TA. In various embodiments, determining the RACH configuration for transmitting any of Msg1, Msg3 and MsgA may include determining to use one preamble and one or more PUSCH transmissions based on a capability to estimate TA accurately. In various embodiments, determining the RACH configuration for transmitting any of Msg1, Msg3 and MsgA may include determining to use one preamble with multiple PUSCH transmissions based on not having a capability to estimate TA accurately. In various embodiments, the methods may include determining the RACH configuration for transmitting any of Msg1, Msg3 and MsgA may include determining to use multiple transmissions of both preamble and PUSCH based on not having the capability to estimate TA accurately.

In various embodiments, the methods may include informing the NTN (e.g., network entity) of an estimated TA. In various embodiments, informing the NTN of the estimated TA may include informing the NTN of the estimated TA using MsgA. In various embodiments, informing the NTN of the estimated TA may include sending the estimated TA and/or a corresponding index to a table of estimated TAs using MsgA. In various embodiments, informing the NTN of the estimated TA may include implicitly informing the NTN of the estimated TA by using a particular parameter or a combination of particular parameters for MsgA.

In various embodiments, the methods may include determining one or a combination of various transmission properties to use for transmission and/or retransmission of MsgA. In various embodiments, the methods may include determining one or a combination of various transmission properties to use for transmission and/or retransmission of MsgA based on a receive status of MsgB. In various embodiments, the receive status of MsgB may include any of a No MsgB status, a MsgB Decoding Failure status, a MsgB indicates ACK for preamble and NACK for PUSCH status, a MsgB indicates NACK for preamble and ACK for PUSCH status, and a MsgB indicates ACK for both preamble and PUSCH status.

In various embodiments, the various transmission properties may include (i) performing power ramping for preamble; (ii) adjusting transmission power; (iii) adjusting modulation and coding scheme (MCS) for PUSCH; (iv) switching from 2-step RACH to 4-step RACH; (v) adjusting the number of PUSCH transmissions; (vi) adjusting a number of preamble transmissions; (vii) adjusting an estimated TA value; (viii) using another resource configuration for MsgA; (ix) selecting a particular preamble format; and (x) using or switching to another (e.g., different) preamble format.

In various embodiments, the methods may include determining a transmit power, TxP, for Msg1, for example, based at least in part on various satellite information received from the network. In various embodiments, the satellite information may include any of a preamble received target power; a power ramping step; a satellite transmit power; a satellite type; an altitude; a speed and ephemeris data. In various embodiments, the methods may include receiving the satellite information, in any of L1, L2, and/or L3 signaling.

In various embodiments, the methods may include determining a receive power based on a reference signal. In various embodiments, the determined received power may comprise a reference signal received power (RSRP).

In various embodiments, the methods may include estimating a pathloss (PL) at time, t1, based on a satellite transmit power and a receive power based on a refence signal. In various embodiments, the methods may include predicting a PL at time, t2, based on any of a calculated distance to a concerned satellite at time, t1, the estimated PL at time, t1, and a predicted distance to the satellite at time. t2. In various embodiments, the methods may include calculating the distance from the satellite at time, t1, based on satellite information. In various embodiments, the satellite information may include satellite altitude and ephemeris data. In various embodiments, the methods may include predicting the distance from the satellite at time, t2, based on information, including a of the WTRU, a satellite altitude, a speed and ephemeris data.

In various embodiments, the methods may include calculating two transmit powers, TxP1, TxP2. In various embodiments, the first and second transmit powers, TxP1, TxP2, may be based on the estimated PL and the predicted PL, respectively. In various embodiments, the first transmit power, TxP1, may be calculated as a combination of a preamble received target power and an estimated PL, and the second transmit power, TxP2, may be calculated as a combination of the preamble received target power and a predicted PL. In various embodiments, the preamble received target power may be obtained from satellite information.

In various embodiments, the methods may include determining a transmit power, TxP, for Msg1 based on the first and second transmit powers, TxP1, TxP2. In various embodiments, determining the transmit power, TxP, for Msg1 may include determining the transmit power, TxP, for Msg1 as a maximum, average or other function of the first and second transmit powers, TxP1, TxP2.

In various embodiments, the methods may include setting and/or applying the transmit power, TxP, for Msg1 according to TxP=min(max power, $f$(TxP1, TxP2)), where the max power may be a maximum transmit power, and where $f$(TxP1, TxP2) is function applied to any of the first and second transmit powers, TxP1, TxP2.

In various embodiments, the methods may include adjusting the first transmit power, TxP1, in accordance with a power ramping step for retransmission of Msg1. In various embodiments, the methods may include determining a transmit power, TxP, for retransmission of Msg1, for example, based at least in part on various satellite information received from the network.

In various embodiments, the methods may include determining a third transmit power, TxP3, for retransmitting Msg1 based on a second predicted PL between the WTRU and the satellite at a time, t3, when Msg1 is intended to and/or expected to arrive at the satellite after retransmission. In various embodiments, the methods may include predicting the second predicted PL at time, t3, based on (e.g., using) any of a calculated distance to the concerned satellite at time, t1, the estimated PL at time, t1, and a predicted distance to the satellite at time. t3. In various embodiments, the methods may include setting and/or applying the transmit power, TxP, for retransmission of Msg1 according to TxP-min(max power, $f$(TxP1+power ramping step, TxP3)), where the max power may be a maximum transmit power, and where $f$(TxP1(t1)+power ramping step, TxP2(t2)) is a function applied to TxP1(t1)+power ramping step and/or TxP2(t2).

In various embodiments, methods for, and/or for use in connection with, performing network access to and/or other procedures in the NTN may be implemented in a WTRU and may include any of receiving, from a network entity, doppler shift compensation information; performing doppler pre-compensation following receipt of the doppler shift compensation information. In various embodiments, the doppler shift compensation information may be a doppler shift compensation command.

In various embodiments, the network entity may be a base station. In various embodiments, the doppler shift compensation information may be received in any of layer 1 (L1), layer 2 (L2), and layer 3 (L3) signaling. In various embodiments, the methods may include the doppler shift compensation information may be received in (or via) any of a medium access control (MAC) control element (CE) and a radio resource control (RRC) message.

In various embodiments, performing the doppler pre-compensation may include adjusting the doppler shift pre-compensation using a previous pre-compensated doppler shift. In various embodiments, the methods may include the previous pre-compensated doppler shift may be based on (e.g., from) information received from the network (e.g., a base station). In various embodiments, the previous pre-compensated doppler shift may be based on (e.g., from) a last UL transmission.

In various embodiments, methods for, and/or for use in connection with, performing network access to and/or other procedures in the NTN may be implemented in a WTRU and may include determining which of one or more synchronization rasters to use based on a type of satellite ("satellite type"). In various embodiments, each (or any) of the synchronization rasters may be associated with one or more satellite types. In various embodiments, the methods may include determining which of the synchronization rasters to use may include determining which of the synchronization rasters to use based on a satellite type being targeted and/or accessed. In various embodiments, a large synchronization raster is used for a LEO satellite. In various embodiments, a small synchronization raster is used for a GEO satellite.

In various embodiments, methods for, and/or for use in connection with, performing network access to and/or other procedures in the NTN may be implemented in a WTRU and may include determining SSB timing of a plurality of beams transmitted by a satellite based on timing of one SSB and a timing pattern among the beams. In various embodiments, the timing pattern may be a (pre-)defined timing pattern. In various embodiments, determining the SSB timing may include determining, based on SSB timing of different beams, a time at which to monitor different frequencies to detect the SSBs from a beam transmitted by the satellite.

In various embodiments, methods for, and/or for use in connection with, performing network access to and/or other procedures in the NTN may be implemented in a WTRU and may include any of monitoring a group common PDCCH (GC-PDCCH); and receiving an indication of a TA command (TAC) for one or more WTRUs. In various embodiments, the methods may include adjusting a TA to that of a group of WTRUs indicated in/by the TAC. In various embodiments, monitoring the GC-PDCCH may include using a GC-RNTI and/or a CORSET to monitor for the TAC for the group of WTRUs.

In various embodiments, methods for, and/or for use in connection with, performing network access to and/or other procedures in the NTN may be implemented in a WTRU and may include autonomously adjusting a TA at a WTRU based on any of ephemeris of a satellite, timing of control and data sent from a network, and GNSS information. In various embodiments, the methods may include the WTRU indicating its TA estimation capability to the network. In various embodiments, the methods may include the WTRU indicating its capability of TA adjustment to the network. In various embodiments, a WTRU (e.g., UE) capability message may be used to indicate the WTRU TA estimation capability to the network. In various embodiments, a WTRU (e.g., UE) capability message may be used to indicate the WTRU capability of TA adjustment to the network.

In various embodiments, methods for, and/or for use in connection with, performing network access to and/or other procedures in the NTN may be implemented in a WTRU and may include indicating any of a WTRU TA estimation capability and a WTRU capability of TA adjustment to the network. In various embodiments, a WTRU (e.g., UE) capability message may be used to indicate the WTRU TA estimation capability to the network. In various embodiments, a WTRU (e.g., UE) capability message may be used to indicate the WTRU capability of TA adjustment to the network.

In various embodiments, methods for, and/or for use in connection with, performing network access to and/or other procedures in the NTN may be implemented in a WTRU and may include determining a TAC mode to use based information from the network. In various embodiments, the TAC mode may indicate a reference timing for the TAC.

In various embodiments, the TAC mode may be an autonomous mode or a non-autonomous mode. In various embodiments, in the autonomous TAC mode the methods may include the WTRU adjusting the TA based on reference timing from any of a previous UL transmission and a previous successful transmission. In various embodiments, in the non-autonomous TAC mode the method may include the WTRU adjusting the TA based on reference timing from a previous TAC. In various embodiments, the methods may include receiving the TAC mode in any of L1, L2 and L3 signaling. In various embodiments, the WTRU may be informed of the TAC mode dynamically in each TAC message. In various embodiments, the WTRU may receive the TAC mode via any of a MAC CE and an RRC message.

In various embodiments, methods for, and/or for use in connection with, performing network access to and/or other procedures in the NTN may include methods for reducing the initial access time of a WTRU to the NTN. In various embodiments, the methods may be implemented in a WTRU and may include any of transmitting multiple preambles (Msg1) before receiving a random-access response (Msg2) from the network. In various embodiments, the methods may be implemented in a WTRU and may include any of determining whether to perform a 2-step random access channel (RACH) procedure or a 4-step RACH procedure; and performing either the 2-step RACH procedure or the 4-step RACH procedure based on the determination. In various embodiments, the methods may be implemented in a WTRU and may include performing both 2-step and 4-step RACH procedures before monitoring for a random-access response (RAR).

Figure 2:
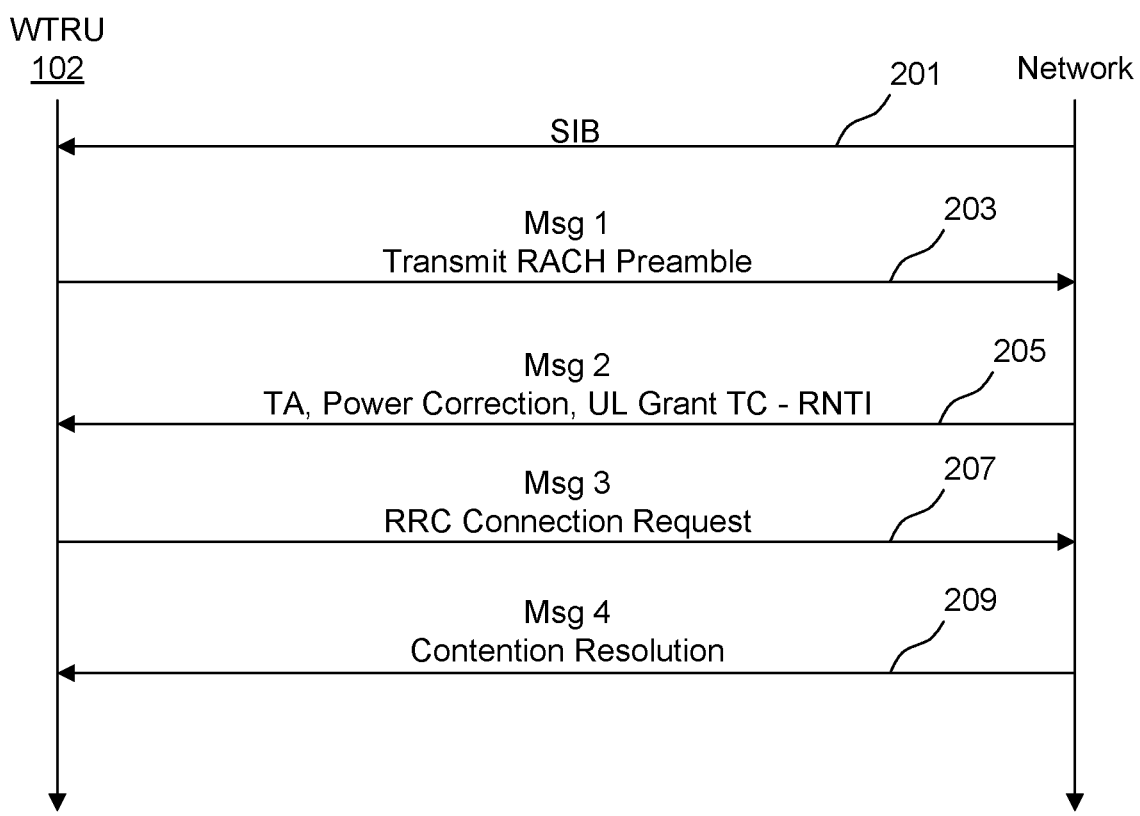
FIG. 2 is a diagram illustrating an example of a 4-step initial access procedure.

FIG. 2 is a diagram illustrating an example 4-step initial access procedure 200. The 4-step initial access procedure 200 may be applicable to NR and NTN, for example. According to the 4-step initial access procedure 200, a WTRU 102 may receive, and may read, a master information block (MIB) (not shown) and/or a system information block-1 (SIB1) (201). The WTRU 102 may perform a Dl synchronization using information obtained from and/or indicated by the MIB and/or SIB1 ("M/SIB information"). The WTRU 102, for example, may determine from the SIB information a resource to use for transmitting a RACH preamble ("Msg1") to the network to indicate its intention to access the network. The WTRU 102 may transmit Msg1 (203) using such resource. The WTRU 102 may monitor for a random-access response (RAR) from the network during a RAR window.

If the network receives Msg1 correctly, it (e.g., the gNB) may send the RAR ("Msg2") (205) to the WTRU. Msg2 may be scrambled with an RA-RNTI. The WTRU 102 may calculate the RA-RNTI as a function of time and frequency of the resource used for transmitting Msg1.

The WTRU 102 may receive Msg2 (205) from the gNB; using the RA-RNTI to descramble the message. Msg2 may include any of a timing advance (TA), a power adjustment/correction, a temporary cell radio network temporary identifier (TC-RNTI), and a resource (grant) for the WTRU 102 to use for transmitting a radio resource control (RRC) connection request ("Msg3").

The WTRU 102 may transmit its identity and an initial access establishment (Msg3) (207) to the network using the granted resource scheduled in Msg2. The network may notify the WTRU 102 of the completion of the initial access procedure via a contention resolution message ("Msg4") (209). Alternately, the WTRU 102 may determine that the initial access procedure has failed if the WTRU 102 does not receive Msg4.

Although the 4-step initial access procedure 200 may be applicable to NR and the NTN, such procedure 200 may be tailored for differences between NR and the NTN. Additionally, modification of the procedure 200 tailored for NR for the NTN (and vice versa) is not straight forward due to various differences between the NTN and NR, including a long round-trip time (RTT) between the WTRU 102 and the network and the possibility of supporting large cell size (e.g., up to 1000 km cell radius) with the integration of the NTN.

Transmission delay in NR may be very small and negligible as compared to other delays that are due to processing time. A consequence of the small transmission delay in NR is that the WTRU 102 can determine a transmission slot of a DL signal when receiving a MIB and/or a SIB1, and in turn, be able to identify the resource to use for transmitting Msg1 and the time (RAR window) at/during which to monitor for Msg2, as they are indicated in/by the SIB1.

Due to the long RTT in the NTN, carrying out the initial access procedure 200 tailored for NR as the initial access procedure for the integrated NTN may result in ambiguity in the resources used for such procedure. For example, the WTRU 102 might not be able to identify accurately the resource to use for transmitting Msg1 and/or the time (RAR window) to monitor for Msg2 because the timing for Msg1 and Msg2 can vary based on the RTTs that the WTRU experiences. Analogously, due to the RTT and to Doppler shift, the network may determine Msg 1 was received on a resource different from the resource actually used by the WTRU 102, and as a result, may incorrectly calculate or otherwise determine the RA-RNTI for scrambling Msg2, may transmit an incorrectly scrambled Msg2 and/or may not transmit the Msg2 in the expected time frame (RAR window). A consequence of the network using one value for the RA-RNTI to scramble Msg2 and the WTRU 102 using a different one value for the RA-RNTI to descramble Msg2 is that the WTRU 102 may not receive Msg2 and/or be able to decode Msg2, which may lead to failure of the initial access procedure.

A satellite of an NTN may move up to 7 km/s (e.g., for low earth orbit (LEO)). Depending on relative locations of a WTRU and the satellite, a signal sent from/to the WTRU can have reception/transmission frequencies shifted significantly, which may not beneficial to the WTRU and the gNB for the decoding process. Doppler-shift pre-compensation may be performed in various embodiments. To support the WTRU in performing Doppler pre-compensation, information, such as speed and location of the satellite, may be exchanged between the WTRU and the network.

In the NTN, a WTRU may need to wait for a very long time between Msg1 and Msg2. Applying a 2-step RACH procedure in the NTN may be beneficial. A 2-step RACH procedure, wherein Msg1 and Msg3 are combined as MsgA, and Msg2 and Msg4 are combined as MsgB, is considered.

Various 4-step RACH procedures for the NTN are considered, as well. And the 4-step RACH procedures for the NTN may be beneficial in various ways, including, for example, maximizing access probability and/or minimizing delay (e.g., latency).

In an embodiment, a WTRU may determine a system frame number (SFN) of the NTN based on various information. The information may include any of a timing of a global navigation satellite system (GNSS), M/SIB1 information, and an offset.

In an embodiment, the WTRU may determine DL transmission timing by any of the following information received from the NTN: (i) a timing offset, $T_{offset}$, between the GNSS time and a DL SFN 0, and (ii) a timing offset between the GNSS time and time information indicated by the SIB1 information.

In an embodiment, the network may indicate the timing offset, $T_{offset}$ between its SFN and the GNSS time. The value of $T_{offset}$ may be sent via the MIB and/or SIB1 to assist the WTRU in the initial access procedure. The WTRU may determine the DL transmission time and RTT of the network by comparing a time at which it receives SIB1 and the time information indicated in/by the SIB1 information. For example, the WTRU may determine the time frame of the network by using (e.g., locally determined) WTRU GNSS time and the $T_{offset}$ value indicated in the M/SIB information. After decoding the timing information in the M/SIB information, the WTRU may determine an exact time the network transmitted SIB1 and the timing delay transmitting the SIB1.

In an embodiment, the WTRU may send its estimated timing to the network based on selecting the PRACH preamble and/or resource.

In an embodiment, the WTRU may send TA information to the network to support the network in scheduling Msg3 and/or further scheduling. The WTRU may send the TA information implicitly. The WTRU, for example, may send an RTT, a transmission delay, and an offset between the RTT or the transmission delay and a predefined value.

The predefined value may be sent to the WTRU via the MIB and/or the SIB. Alternatively, the predefined value may be preconfigured based on a satellite type.

The WTRU may send the TA information to the network implicitly in Msg1. For example, the WTRU may send the TA information by selecting any of a PRACH resource, a PRACH group, a PRACH format, and a PRACH configuration.

In an embodiment, the WTRU may be configured with a plurality of PRACH resources (e.g., time and frequency) to transmit Msg1. Each PRACH resource may be associated with a range of TAs.

In an embodiment, the WTRU may be configured with multiple PRACH preamble groups. Each PRACH preamble group may correspond to a (e.g., one) range of TAs. Based on a value of an estimated TA, the WTRU may select an appropriate PRACH resource and/or PRACH preamble group. The WTRU may select a default preamble group and/or resource, e.g., if the TA information is not conveyed in Msg1. Using this approach may support non-GNSS WTRUs, which may not have information about TA between the network and themselves.

In an embodiment, the WTRU may be configured (e.g., statically, semi-statically and/or dynamically) with one or more PRACH configurations. Any of the PRACH configurations may define, indicate and/or include a preamble format and/or a period of a PRACH occasion ("PRACH-occasion period"). The preamble format may define, indicate and/or include any of a preamble sequence length, a number of repetitions, a cyclic prefix, a guard period, etc. The PRACH-occasion period may define, indicate and/or include a time between two consecutive PRACH occasions.

In an embodiment, the WTRU may select a PRACH configuration based on its capability and the information provided in/by the M/SIB information. In an embodiment, the WTRU may select a PRACH configuration to transmit Msg1 based on any of whether the WTRU is a GNSS-based WTRU, a satellite type, a minimum delay of the transmission, a maximum delay of the transmission, a priority level of the WTRU, a QoS of the data in the buffer of the medium access control (MAC) layer, a Doppler compensation capability, and a TA (e.g., an estimate of a TA) of the WTRU.

In an embodiment, the WTRU may select one or more of the PRACH configurations depending on its capability of estimating a transmission delay. For example, if not equipped with a GNSS receiver and/or unable (e.g., not capable) to estimate the transmission delay accurately, the WTRU may select a PRACH configuration with a longer sequence length and/or higher number of repetitions. Alternatively, if equipped with a GNSS receiver and able to estimate the transmission delay accurately, for example, the WTRU may select a PRACH configuration with a shorter sequence length and/or lower number of sequence repetitions.

In an embodiment, the WTRU may select a preamble group based on a location of the PRACH resource. In an embodiment, the WTRU may select different preamble groups based on the location of the PRACH resource within a delay difference period. The delay difference period may be defined as, based on, a function of, etc. a maximum delay difference within a beam. This approach may support the network in determining the PRACH resource used by the WTRU to transmit Msg1, because the WTRU may not have the accurate timing of the uplink frame. By selecting a PRACH resource in a same group for different PRACH time resources, the network and the WTRU may interpret the PRACH time resource differently. Consequently, the WTRU may fail to decode the Control Resource Set (CORESET) for Msg2.

In an embodiment, the WTRU may select a PRACH configuration with a longer sequence length and/or a higher number of repetitions if it is a high priority WTRU and/or if it has a high QoS requirement of the data in the buffer of the MAC layer. In an embodiment, if the WTRU is a low priority WTRU, it may select a PRACH configuration with shorter sequence length and/or lower number of sequence repetitions.

In an embodiment, the WTRU may determine the delay difference period. In an embodiment, the WTRU may determine the delay difference period based on (as a function of, etc.) any of a maximum delay difference within a beam, a PRACH configuration period, a synchronization signal block (SSB) period, and a preconfigured value based on a satellite type.

In an embodiment, the maximum delay difference within a beam may be conveyed to the WTRU by the network via a MIB and/or a SIB1. In an embodiment, the PRACH configuration period may be notified to the WTRU via a SIB1. In an embodiment, the Synchronization Signal Block (SSB) period may be preconfigured or notified to the WTRU via a SIB1. In an embodiment, the beginning of the delay difference period may be determined based on a time that the WTRU receives SIB1 or an initial occasion of a PRACH resource.

In an embodiment, the WTRU may determine a number of preamble groups, N_pg, based on any a number of PRACH resources within a delay difference period, a number of PRACH times within a delay difference period, and a number of PRACH frequencies within a delay difference period.

The number of preambles within a preamble group may be equal for different preamble groups. The mapping between a PRACH resource and a preamble group may follow a pre-defined rule of preamble group indexing and PRACH resource indexing. The PRACH resource indexing may sequentially follow time and frequency order or it may follow frequency and time order.

Figure 3:
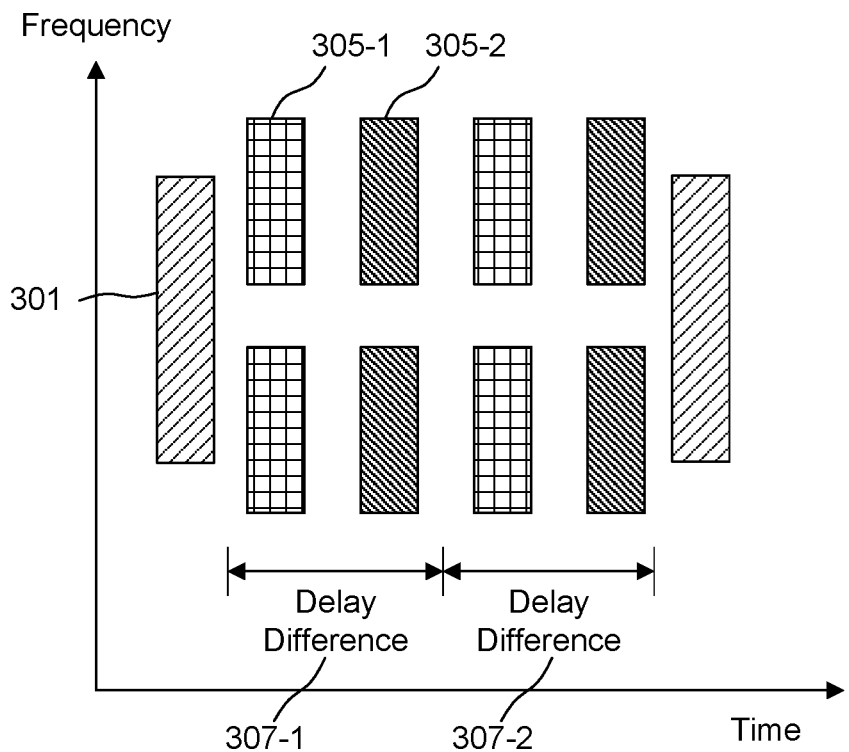
FIG. 3 is a system resource diagram illustrating an example preamble-group allocation for a synchronization signal block (SSB)

FIG. 3 is a system resource (time and frequency) diagram 300 illustrating an example allocation ("preamble-group allocation") of preamble groups for an SSB. As shown, the resource diagram 300 may include a first (in time) SSB $301_n$ followed by a second (in time) SSB $301_{n+1}$, the SSB $301_n$, a first preamble group 305-1, a second preamble group 305-2, a first delay difference period 307-1, and a second delay difference period 307-2. Although not shown, the resource diagram 300 may include PRACH selection windows following each of the SSBs $301_n$, $301_{n+1}$.

With reference to FIG. 3, a WTRU 102 may detect SSB $301_n$ and may decode and read SIB1 for the SSB $301_n$. Based on information read from the SIB1, the WTRU 102 may obtain a PRACH configuration indicated by the SIB1.

The WTRU 102 may divide the PRACH selection windows to one or multiple delay difference periods. The WTRU may determine two possible times to transmit Msg1 within a delay difference period. The WTRU may determine the number of preamble groups based on the number of possible PRACH times within a delay difference period. Since there are two possible times to transmit Msg1 within a delay difference period, the WTRU may divide the set of preambles into two equal size preamble groups, namely, first and second preamble groups 305-1, 305-2. As shown, the first preamble group 305-1 may be allocated to the first possible time for the PRACH transmission and the second preamble group 305-2 may be allocated to the second possible time for the PRACH transmission. Assuming that the number of PRACH preambles assigned to the SSB is N_Preamble, then the size of each PRACH group is N_Preamble/N_pg. As applied to the example of FIG. 3, where N_pg=2 and N_Preamble=64, 32 of the 64 32 of the 64 (i.e., 64/2=32) preambles are allocated to each of the first and second PRACH preamble groups.

In an embodiment, the WTRU may be configured to select one or more preamble groups based on the location of the PRACH resource within a delay difference period and its associated SSB. This approach may allow the WTRU to notify the network with its intended SSB in case that multiple SSBs are supported.

In an embodiment, the WTRU may be configured to be able to access all the possible PRACH occasions. The WTRU may be configured to determine the total number of PRACH preambles assigned to itself by dividing the total number of the preambles assigned to each PRACH occasion by the total number of SSBs. The initial index for the preamble associated with the SSB and PRACH occasion may be calculated based on the index of the intended SSB and the location of the PRACH occasion. The WTRU may be configured to inform the network of the intended SSB.

In an embodiment, the WTRU may select its PRACH occasion and PRACH group based on its associated SSB and its selected PRACH occasion in a delay difference period, respectively. By way of example, the WTRU may be configured to sequentially associate a PRACH occasion to an SSB. And for all PRACH occasions, the WTRU may be configured to select different preamble groups based on the time of the PRACH resource within a delay difference period.

Figure 4:
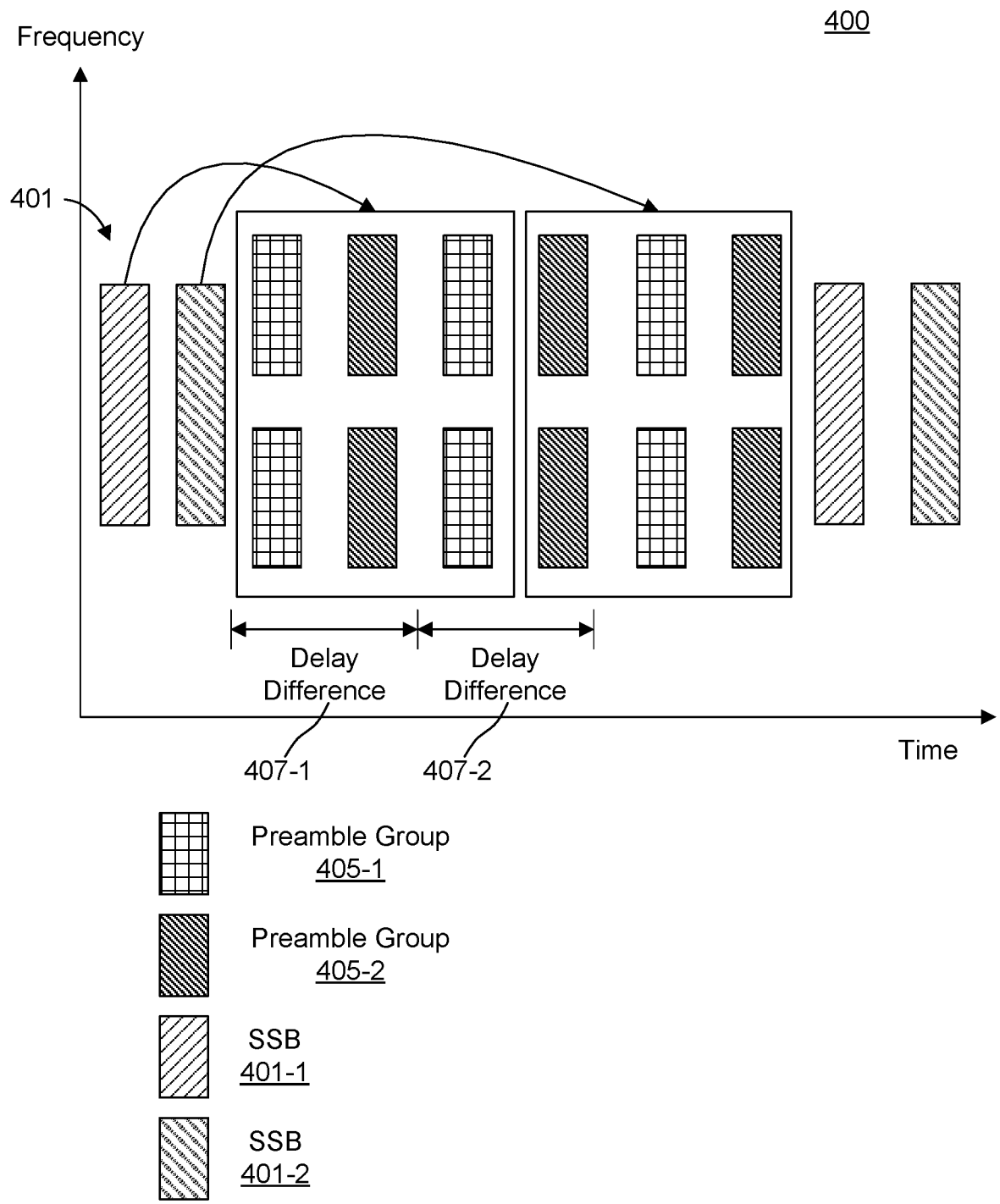
FIG. 4 is a system resource diagram illustrating an example preamble-group allocation for an SSB set.

FIG. 4 is a system resource (time and frequency) diagram 400 illustrating an example preamble-group allocation for an SSB set. As shown, the resource diagram 400 may include an SSB set 401, a first preamble group 405-1, a second preamble group 405-2, a first delay difference period 407-1, and a second delay difference period 407-2. Although not shown, the resource diagram 300 may include a third delay difference period following the second delay difference period and PRACH selection windows following each of the instances of the SSB set 401.

With reference to FIG. 4, the SSB set 401 may include first and second SSBs 401-1, 401-2. The total number of PRACH time instances associated with the two SSBs may be equal to six (e.g., as shown). The WTRU may associate the first SSB 401-1 with three PRACH time instances and associate the second SSB 401-2 with three PRACH time instances. The WTRU may divide the PRACH selection windows to one or multiple delay difference periods. The WTRU may select any of the possible PRACH time instances associated to a selected one the SSBs 401-1, 401-2. The WTRU may select one PRACH occasion in one PRACH time instance to transmit Msg1. Based on the time instance of the selected PRACH occasion within one of the delay difference periods 407-1, 407-2, the WTRU may select either the first preamble group 305-1 or the second preamble group 305-2.

In an embodiment, the WTRU 102 may select a preamble group and a preamble within the group based on a selected delay difference period. In an embodiment, the WTRU 102 may be configured with a set of preambles. The WTRU 102 may divide its PRACH selection windows to one or multiple delay difference periods, in which each period may be associated with one preamble group. When the WTRU 102 selects the PRACH location to transmit Msg1, depending on the selected delay difference period, the WTRU may select an appropriate preamble.

Figure 5:
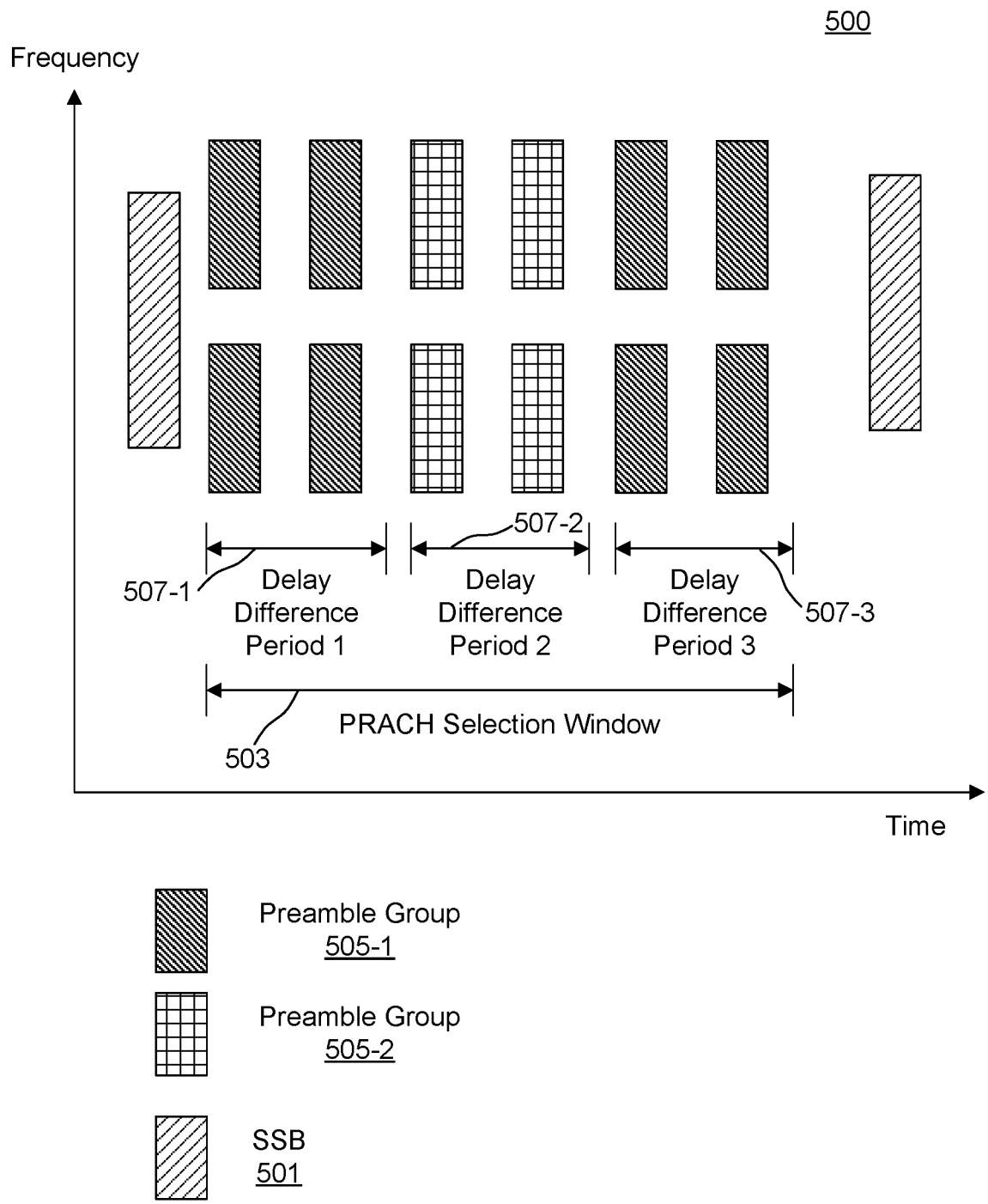
FIG. 5 is a system resource diagram illustrating an example of preamble-group allocation.

FIG. 5 is a system resource (time and frequency) diagram 500 illustrating an example preamble-group allocation of a PRACH selection window. As shown, the resource diagram 500 may include a first (in time) SSB $501_n$ followed by a second (in time) SSB $501_{n+1}$, a PRACH selection window 503 following the SSB $501_n$, a first preamble group 505-1, a second preamble group 505-2, a first delay difference period 507-1, a second delay difference period 507-2 and a third delay difference period 507-3. Although not shown, the resource diagram 500 may include a PRACH selection window following the SSB $501_{n+1}$.

With reference to FIG. 5, the WTRU 102 may divide the PRACH selection window into three delay difference periods. If the WTRU transmits Msg1 in delay difference period 507-1 and delay difference period 507-3, the WTRU 102 may select the first preamble group 505-1, otherwise, if the WTRU 102 selects the delay difference period 507-2, it may select preamble group 505-2.

In an embodiment, the WTRU 105 may select a preamble group based on a selected SSB and delay difference period. For example, the WTRU 102 may be sequentially associate a PRACH occasion to an SSB. And for all PRACH occasions, the WTRU may select different preamble groups based on its selected delay difference period.

Figure 6:
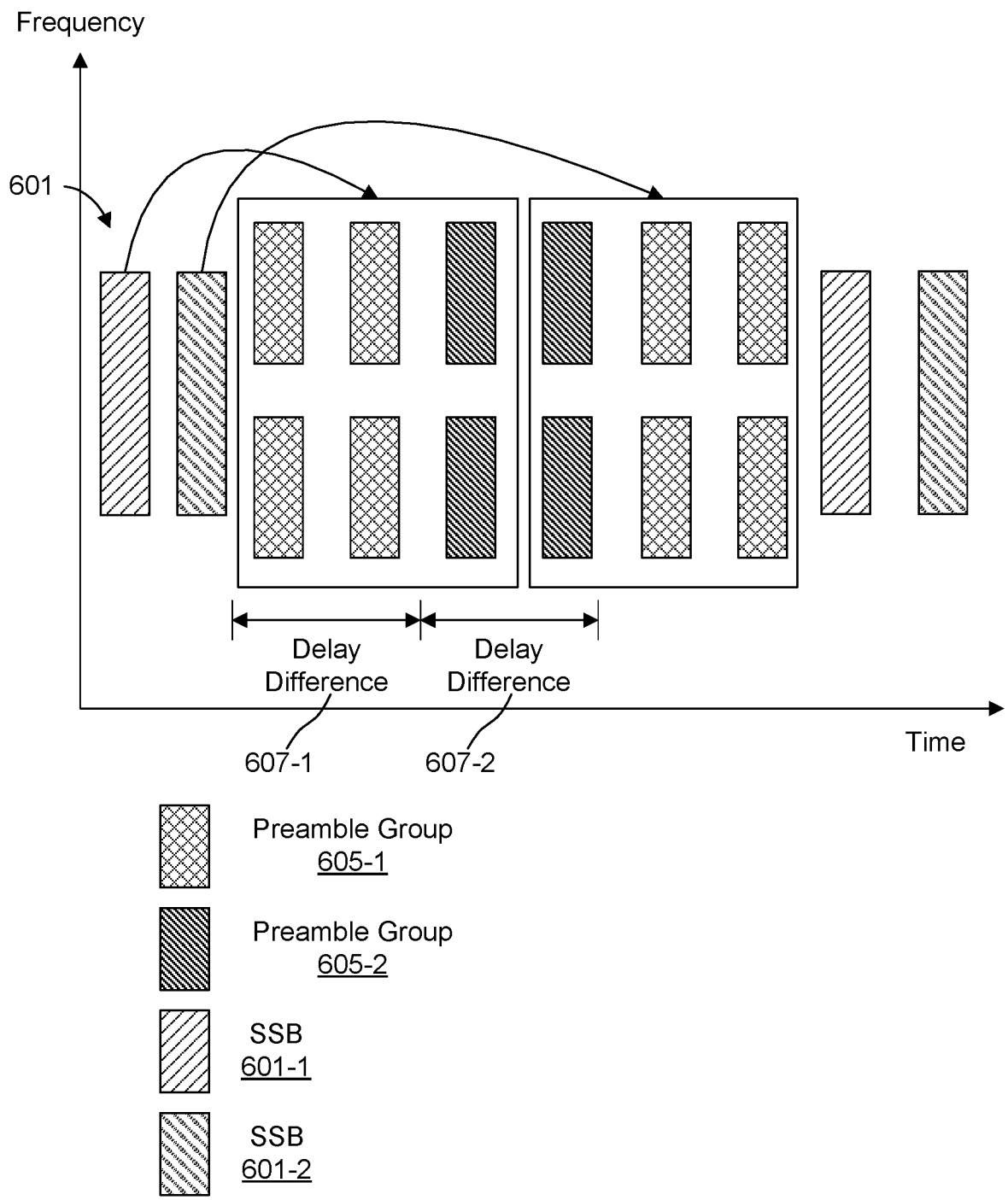
FIG. 6 is a system resource diagram illustrating an example preamble-group allocation for an SSB set.

FIG. 6 is a system resource (time and frequency) diagram 600 illustrating an example preamble-group allocation for an SSB set. As shown, the resource diagram 600 may include an SSB set 601, a first preamble group 605-1, a second preamble group 605-2, a first delay difference period 607-1 and a second delay difference period 607-2. Although not shown, the resource diagram 600 may include a third delay difference period following the second delay difference period and PRACH selection windows following each of the instances of the SSB set 601.

With reference to FIG. 6, the SSB set 601 may include first and second SSBs 601-1, 601-2. The number of PRACH time instances associated with the two SSBs 601-1, 601-2 may be equal to six (e.g., as shown). The WTRU 102 may associate the first SSB 601-1 with three PRACH time instances and associate the second SSB 601-2 with three PRACH time instances. The WTRU 102 may divide the PRACH selection windows to one or multiple delay difference periods. The WTRU 102 may select any of the PRACH time instance associated to a selected one the SSBs 601-1, 601-2. The WTRU 102 may select one PRACH occasion to transmit Msg1. Based on which of the delay difference periods 607-1, 607-2 includes the selected PRACH occasion, the WTRU 102 may select either the first preamble group 605-1 or the second preamble group 605-2.

In an embodiment, the WTRU may be configured to select different frequency resources to transmit Msg1 based on its PRACH transmission time within the delay difference period. This approach may avoid a misunderstanding between the network and the WTRU in calculating RA-RNTI. The initial frequency for PRACH may be conveyed to the WTRU via SIB1. Based on the time index of the PRACH occasion within the delay difference period, the WTRU may determine the frequency to transmit Msg1. This frequency may be determined as f=finit+PRACHindex*Δf, where finit is the initial frequency of PRACH indicated in/by SIB1 and Δf is the frequency resource for each PRACH.

Figure 7:
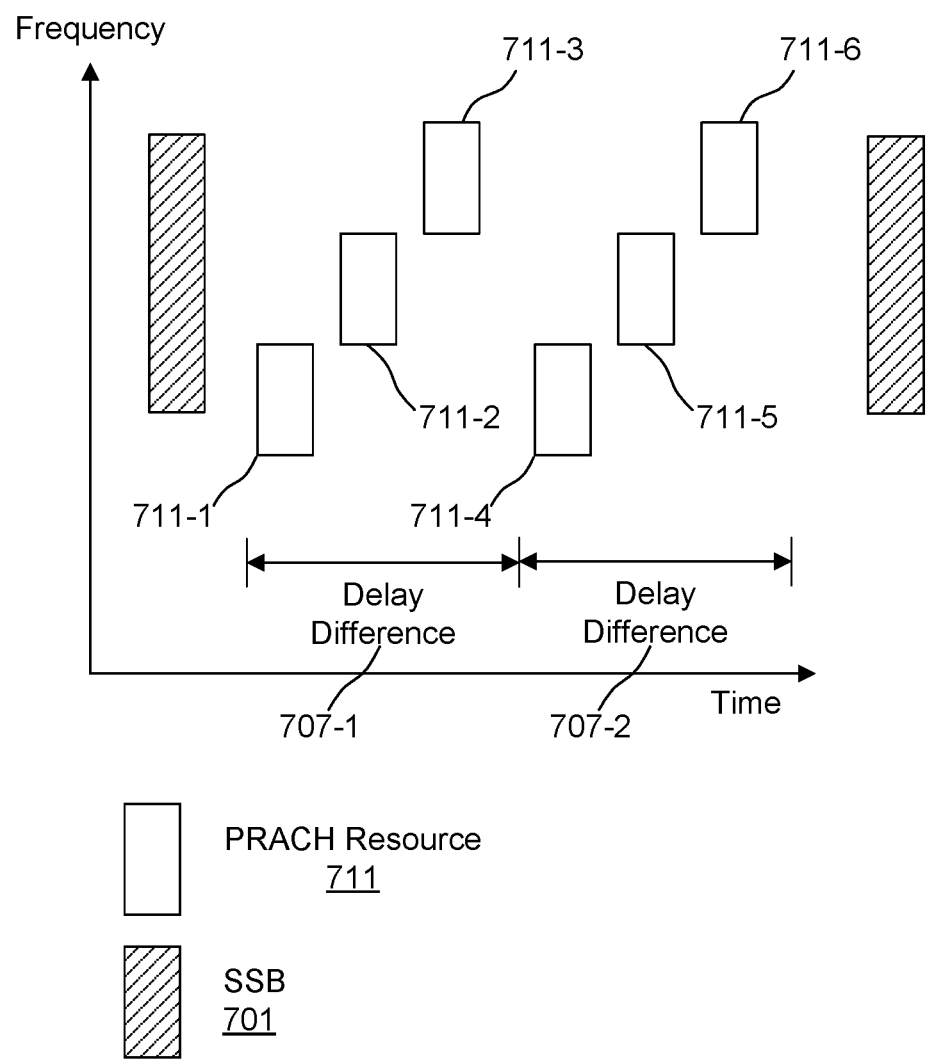
FIG. 7 is a system resource diagram illustrating an example preamble-group allocation.

FIG. 7 is a system resource (time and frequency) diagram 700 illustrating an example preamble-group allocation. As shown, the resource diagram 700 may include a first (in time) SSB $701_n$ followed by a second (in time) SSB $701_{n+1}$, six PRACH resources 711-1-711-6, a first delay difference period 707-1 and a second delay difference period 707-2.

With reference to FIG. 7, the WTRU 102 may be configured with three PRACH transmission times within at least the first delay difference period 707-1. Based on a time index within the delay difference period 707-1, the WTRU 102 may select an appropriate frequency to transmit Msg1. Selecting a different frequency for each PRACH transmission time within a delay difference period may allow the gNB to identify the time resource(s) that the WTRU uses for PRACH transmission.

Figure 8:
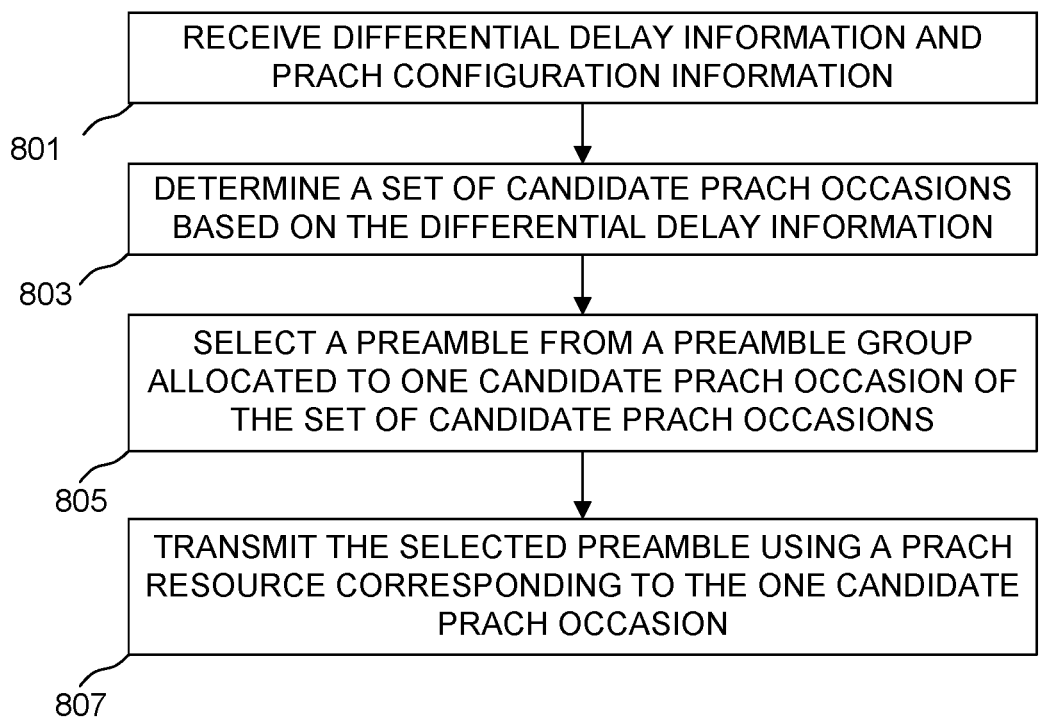
FIG. 8 is a flow diagram illustrating an example preamble-group allocation procedure.

FIG. 8 is a flow diagram illustrating an example procedure for performing preamble-group allocation ("preamble-group allocation procedure") 800. For convenience and simplicity of exposition, the preamble-group allocation procedure 800 from a perspective of a WTRU 102. One skilled in the art will recognize that the preamble-group allocation procedure 800 may be carried out using other or different system resources than that disclosed herein and/or other or different perspectives and architectures, The WTRU 102 may receive differential delay information and PRACH configuration information (801). The differential delay information and PRACH configuration information may be received from a network element of the NTN. The PRACH configuration information may indicate a set of preambles and a PRACH occasions configuration. The differential delay information may be and/or include a maximum delay difference.

The WTRU 102 may determine a set of candidate PRACH occasions, from among a plurality of PRACH occasions of the PRACH occasion configuration, based on the differential delay information (803). The WTRU 102 may select a preamble from a preamble group allocated to one candidate PRACH occasion of the set of candidate PRACH occasions (805). The WTRU 102 may transmit the selected preamble using a PRACH resource corresponding to the one candidate PRACH occasion (807).

In various embodiments, the WTRU 102 may determine the set of candidate PRACH occasions at least in part by determining, from among the plurality of PRACH occasions of the PRACH occasion configuration, the set of candidate PRACH occasions that are within one delay difference period. In various embodiments, the WTRU 102 may determine a number of preamble groups based on a number of PRACH resources within the delay difference period.

In various embodiments, the WTRU 102 may allocate a preamble group (e.g., one of multiple preamble groups) to the one candidate PRACH occasion. In various embodiments, the WTRU 102 may allocate the preamble group to the one candidate PRACH occasion based on a rule. In various embodiments, the rule may specify that one partition of the set of preambles is to be allocated. In various embodiments, the preamble group may be allocated to the one candidate PRACH occasion based on a configured mapping. In various embodiments, the preamble group may be a subset of the set of preambles. In various embodiments, the WTRU 102 may allocate to the candidate PRACH occasions respective groups of the preambles.

In various embodiments, the WTRU 102 may randomly select the one candidate PRACH occasion from among the set of candidate PRACH occasions. In various embodiments, the WTRU 102 may determine the one candidate PRACH occasion from among the set of candidate PRACH occasions based on the preamble group allocated to the one candidate PRACH occasion including a preamble having a particular characteristic. In various embodiments, the WTRU 102 may determine the one candidate PRACH occasion from among the set of candidate PRACH occasions based on a second group of the preambles allocated to another candidate PRACH occasion lacking a preamble having a particular characteristic.

Figure 9:
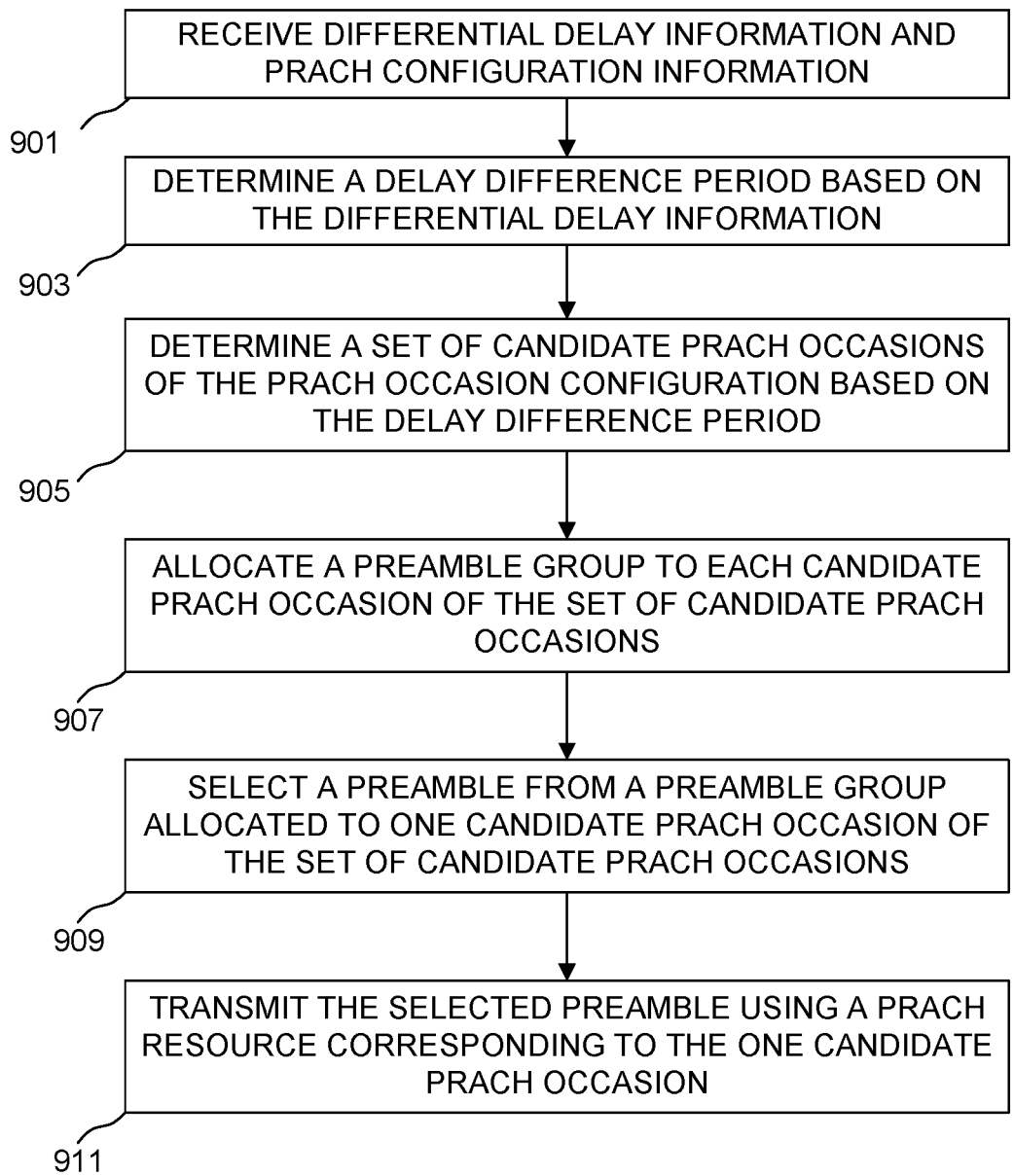
FIG. 9 is a flow diagram illustrating an example preamble-group allocation procedure.

FIG. 9 is a flow diagram illustrating an example preamble-group allocation procedure 900. For convenience and simplicity of exposition, the preamble-group allocation procedure 900 from a perspective of a WTRU 102. One skilled in the art will recognize that the preamble-group allocation procedure 900 may be carried out using other or different system resources than that disclosed herein and/or other or different perspectives and architectures.

The WTRU 102 may receive differential delay information and PRACH configuration information (901). The differential delay information and PRACH configuration information may be received from a network element of the NTN. The PRACH configuration information may indicate a set of preambles and a PRACH occasions configuration. The differential delay information may be and/or include a maximum delay difference.

The WTRU 102 may determine a delay difference period based on the differential delay information (903). The WTRU 102 may determine a set of candidate PRACH occasions of the PRACH occasion configuration based on the delay difference period (905). The WTRU 102 may allocate a preamble group to each candidate PRACH occasion of the set of candidate PRACH occasions (907). The WTRU 102 may select a preamble from the preamble group allocated to one candidate PRACH occasion of the set of candidate PRACH occasions (909). The WTRU 102 may transmit the selected preamble using a PRACH resource corresponding to the one candidate PRACH occasion (911).

The preamble-group allocation procedure 900 of FIG. 9 is similar to the preamble-group allocation procedure 800 of FIG. 8. One of skill in the art will recognize that various embodiments disclosed in connection with the preamble-group allocation procedure 800 of FIG. 8 are equally applicable as various embodiments of the preamble-group allocation procedure 900 of FIG. 9. Additionally, one of skill in the art will recognize that various embodiments discloses infra are applicable embodiments to both of the preamble-group allocation procedures 800 and 900.

In various embodiments, the WTRU 102 may determine the one candidate PRACH occasion from among the set of candidate PRACH occasions based on the group of the preambles allocated to one candidate PRACH occasion corresponding to a range of timing advances between the WTRU and the network.

In various embodiments, the set of candidate PRACH occasions may be associated with an SSB.

In various embodiments, the WTRU 102 may select at least one frequency resource to transmit the selected preamble. In various embodiments, the WTRU 102 may select a PRACH resource corresponding to the one candidate PRACH occasion and based on frequency hopping configured by the network, and may transmit the selected preamble using that PRACH resource.

In various embodiments, the WTRU 102 may determine an RA-RNTI based on the PRACH resource. In various embodiments, the WTRU 102 may decode a Msg2 using the determined RA-RNTI.

In various embodiments, the WTRU 102 may inform the network of an estimated TA.

In various embodiments, the WTRU 102 may determine a transmit power, TxP, for Msg1, for example, based at least in part on various satellite information received from the network. In various embodiments, the satellite information may include any of a preamble received target power; a power ramping step; a satellite transmit power; a satellite type; an altitude; a speed and ephemeris data. In various embodiments, the WTRU 102 may receive the satellite information, in any of L1, L2, and/or L3 signaling. In various embodiments, the WTRU 102 may determine a receive power based on a reference signal. In various embodiments, the determined received power may be or include an RSRP.

In various embodiments, the WTRU 102 may estimate a PL at time, t1, based on a satellite transmit power and a receive power based on a reference signal. In various embodiments, the WTRU 102 may predict a PL at time, t2, based on any of a calculated distance to a concerned satellite at time, t1, the estimated PL at time, t1, and a predicted distance to the satellite at time. t2. In various embodiments, the WTRU 102 may calculate the distance from the satellite at time, t1. based on satellite information, such as any of satellite altitude and ephemeris data. In various embodiments, the WTRU 102 may predict the distance from the satellite at time, t2, based on information, including a of the WTRU, a satellite altitude, a speed and ephemeris data.

In various embodiments, the WTRU 102 may calculate two transmit powers, TxP1, TxP2. In various embodiments, the first and second transmit powers, TxP1, TxP2, may be based on the estimated PL and the predicted PL, respectively. In various embodiments, the WTRU 102 may calculate the first and second transmit powers, TxP1, TxP2, as follows:

$TxP1 =$ preamble received target power+estimated PL,
and $TxP2 =$ preamble received target power+predicted PL.

In various embodiments, the preamble received target power is obtained from satellite information.

In various embodiments, the WTRU 102 may determine a transmit power, TxP, for Msg1 based on the first and second transmit powers, TxP1, TxP2. In various embodiments, the WTRU 102 may determining the transmit power, TxP, for Msg1 as a maximum, average or other function of the first and second transmit powers, TxP1, TxP2.

In various embodiments, the WTRU 102 may set and/or applying the transmit power, TxP, for Msg1 according to the following:

$TxP = \min(\max \text{ power}, f(TxP1, TxP2))$ where max power may be a maximum transmit power and $f(TxP1, TxP2)$ is a function that may be applied to any of TxP1 and TxP2.

In various embodiments, the WTRU 102 may determine a transmit power, TxP, for retransmission of Msg1, for example, based at least in part on various satellite information received from the network. In various embodiments, the WTRU 102 may adjust the first transmit power, TxP1, in accordance with a power ramping step for retransmission of Msg1.

In various embodiments, the WTRU 102 may determine a third transmit power, TxP3, for retransmitting Msg1 based on a second predicted PL between the WTRU and the satellite at a time, t3, when Msg1 is intended to and/or expected to arrive at the satellite after retransmission. In various embodiments, the WTRU 102 may predict the second predicted PL at time, t3, based on (e.g., using) any of a calculated distance to the concerned satellite at time, t1, the estimated PL at time, t1, and a predicted distance to the satellite at time. t3.

In various embodiments, the WTRU 102 may set and/or apply the transmit power, TxP, for retransmission of Msg1 according to:

$$TxP = \min(\text{max power}, f(TxP1+\text{power ramping step}, TxP3))$$

where max power may be the maximum transmit power and $f(TxP1(t1)+\text{power ramping step}, TxP2(t2))$ is a function that may be applied to $TxP1(t1)+\text{power ramping step}$ and/or $TxP2(t2)$.

In an embodiment, a WTRU may perform Doppler pre-compensation based on a speed vector sent by the network. In an embodiment, the WTRU may be configured to perform Doppler pre-compensation by using information received from the network and/or information estimated by and/or preconfigured into the WTRU. The information received from the network may include, for example, the speed vector and a maximum distance and/or a minimum distance. The information estimated by and/or preconfigured into the WTRU may include, for example a TA and satellite ephemeris.

In an embodiment, a WTRU may receive doppler shift compensation information (e.g., doppler shift compensation command, other triggering information, etc.) from a gNB (or other access node). The WTRU may perform doppler pre-compensation following receipt of (e.g., in response to receiving) the doppler shift compensation information. The WTRU may receive doppler shift compensation information from the gNB, for example, in any of layer 1 (L1), layer 2 (L2), and layer 3 (L3) signaling, such as a MAC control element (CE) or a radio resource control (RRC) message. The WTRU may adjust the Doppler shift pre-compensation following receipt of (e.g., in response to receiving) the doppler shift compensation information, possibly using as reference the previous pre-compensated Doppler shift from the gNB, and/or the pre-compensated Doppler shift from the last UL transmission. The Doppler shift pre-compensation approach may assist in reducing inter-frequency interference among different scheduled resources.

Pursuant to the various embodiments disclosed herein, an RA-RNTI may be determined in various ways. In an embodiment, the WTRU may determine RA-RNTI based on a selected PRACH configuration. In an embodiment, the WTRU may calculate the RA-RNTI by using the time and frequency indices of the PRACH occasion. This approach may reduce the number of RA-RNTI used. In an embodiment, the WTRU may follow the following formulation of RA-RNTI $$RA\text{-}RNTI = C + t_{index} + X * f_{index} \quad (1)$$

where C is a constant, $t_{index}$, $f_{index}$ are time and frequency indices of the PRACH occasion, and X may be determined based on any of the following:
X is based on maximum time and frequency indices of all possible PRACH configurations;
X is based on the maximum time and frequency indices of the current PRACH configuration; and
X is pre-configured.

In an embodiment, RA-RNTI can be calculated as $$RA\text{-}RNTI = C + f_{index} + Y * t_{index}, \quad (2)$$

where C is a constant, $t_{index}$, $f_{index}$ are time and frequency indices of the PRACH occasion, and Y may be determined based on any combination of the following:
Y is based on maximum time and frequency indices of all possible PRACH configurations;
Y is based on the maximum time and frequency indices of the current PRACH configuration; and
Y is pre-configured.

According to an embodiment, the WTRU may determine the initial frame for time indexing.

The WTRU may determine the initial frame for time indexing of $t_{index}$ or the initial frame for the calculation of RA-RNTI based on the duration of RAR window $F_R$ that the network wants to support. In an embodiment, the frame index in which the WTRU transmits Msg1 may be calculated as follows:

$$frame_{index} = \left\lfloor \frac{PRACH_{frame}}{F_R} \right\rfloor, \quad (3)$$

where $PRACH_{frame}$ indicates the SFN in which the WTRU may transmit Msg1. The WTRU may determine that the initial frame for indexing of $t_{index}$ and/or the initial frame for the calculation of RA-RNTI is $frame_{index}-1$ frames before the current SFN.

In an embodiment, the WTRU may determine time indices of its selected PRACH locations.

In an embodiment, the WTRU may determine a time index of every PRACH time occasion. This approach may be interesting in the case that the network and the WTRU have a common understanding of the intended PRACH location that the WTRU has sent.

Figure 10:
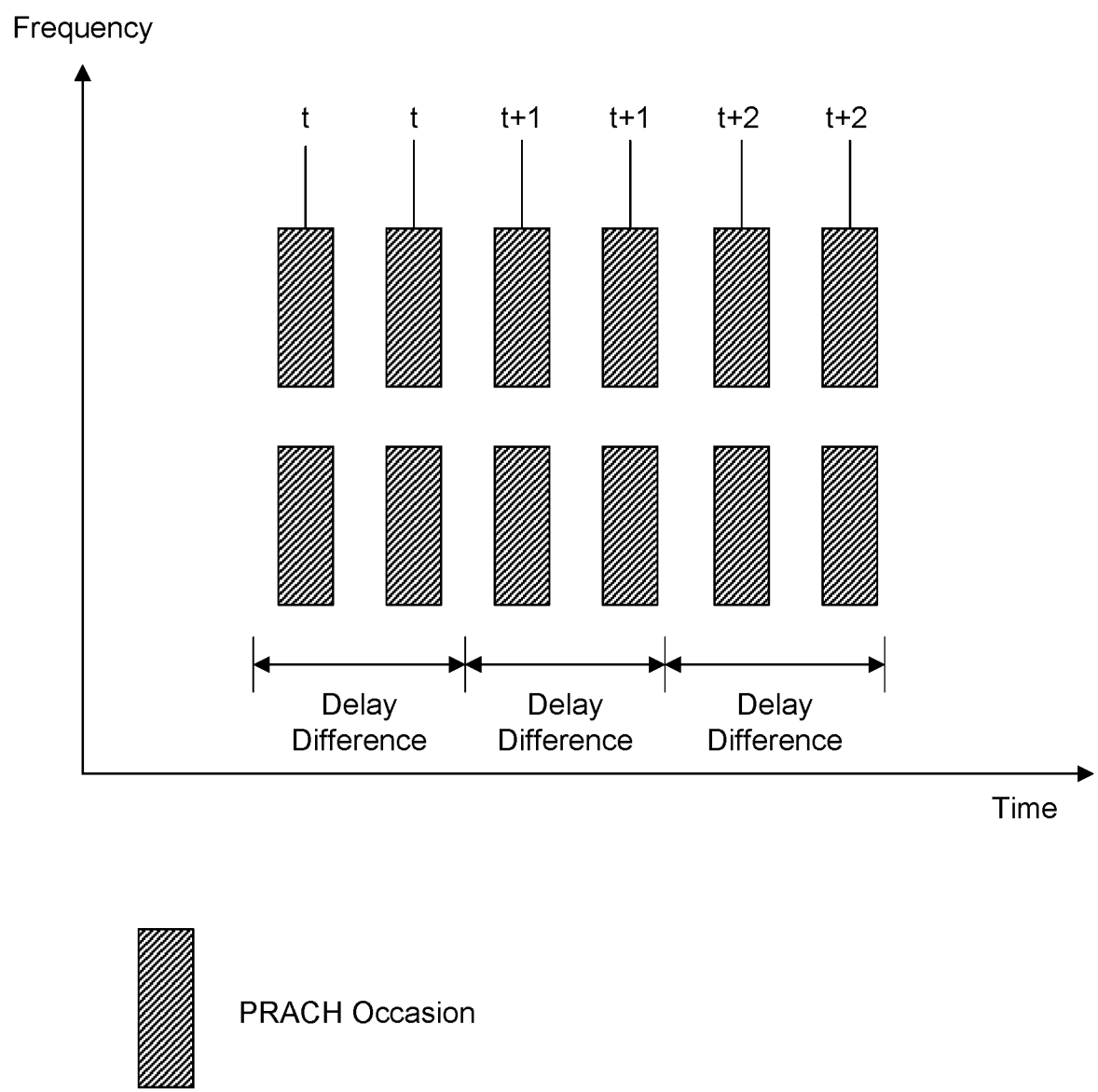
FIG. 10 is a system resource diagram illustrating an example of PRACH occasion time indexing.

In an embodiment, the WTRU may determine a time index of every delay difference period. This approach may allow the network to group all Msg1 transmissions in one frequency and within a delay difference period to one RA-RNTI value. For example, as illustrated in FIG. 10, each delay difference period consists of two PRACH time instances. Therefore, the two PRACH time instances within one delay difference period have the same index.

In another approach, the WTRU may be configured to decode Msg2 using multiple RA-RNTIs within a delay difference period. Specifically, the WTRU may determine the number of PRACH time instances within the delay difference period in which it transmits Msg1. Then, the WTRU may calculate all the possible RA-RNTIs during the delay difference period. Those RA-RNTIs may be used to descramble Msg2 in the random-access response period. This approach may allow the WTRU to consider the delay difference of the WTRUs served by one SSB.

Pursuant to the various embodiments disclosed herein, reductions in delays contributing to the amount of time for carrying out an initial access procedure and/or increases in access probability (e.g., fewer unsuccessful access attempts) may be realized. In an embodiment, the WTRU may transmit multiple Msg1 transmissions before receiving Msg2. In an embodiment, the WTRU may determine to transmit N Msg1s before each RACH occasion and the WTRU may transmit such N Msg1s over M RACH occasions. The WTRU may apply various (e.g., different) power adjustments for the different transmissions of Msg1. The power adjustment may be determined based on the PRACH location and/or an assumption about the delay between the WTRU and the network. This may allow the WTRU to adjust the transmit power of Msg1 when different delays are assumed by the WTRU.

The WTRU may be configured with maximum values of M and N. The values of M and N within their configured ranges may be determined based on any of the capability of the WTRU in estimating the delay, the minimum and/or maximum delay of the transmission, the QoS of data, the priority level of the WTRU, the number of available PRACH sequences; and the configuration of PRACH.

Figure 11:
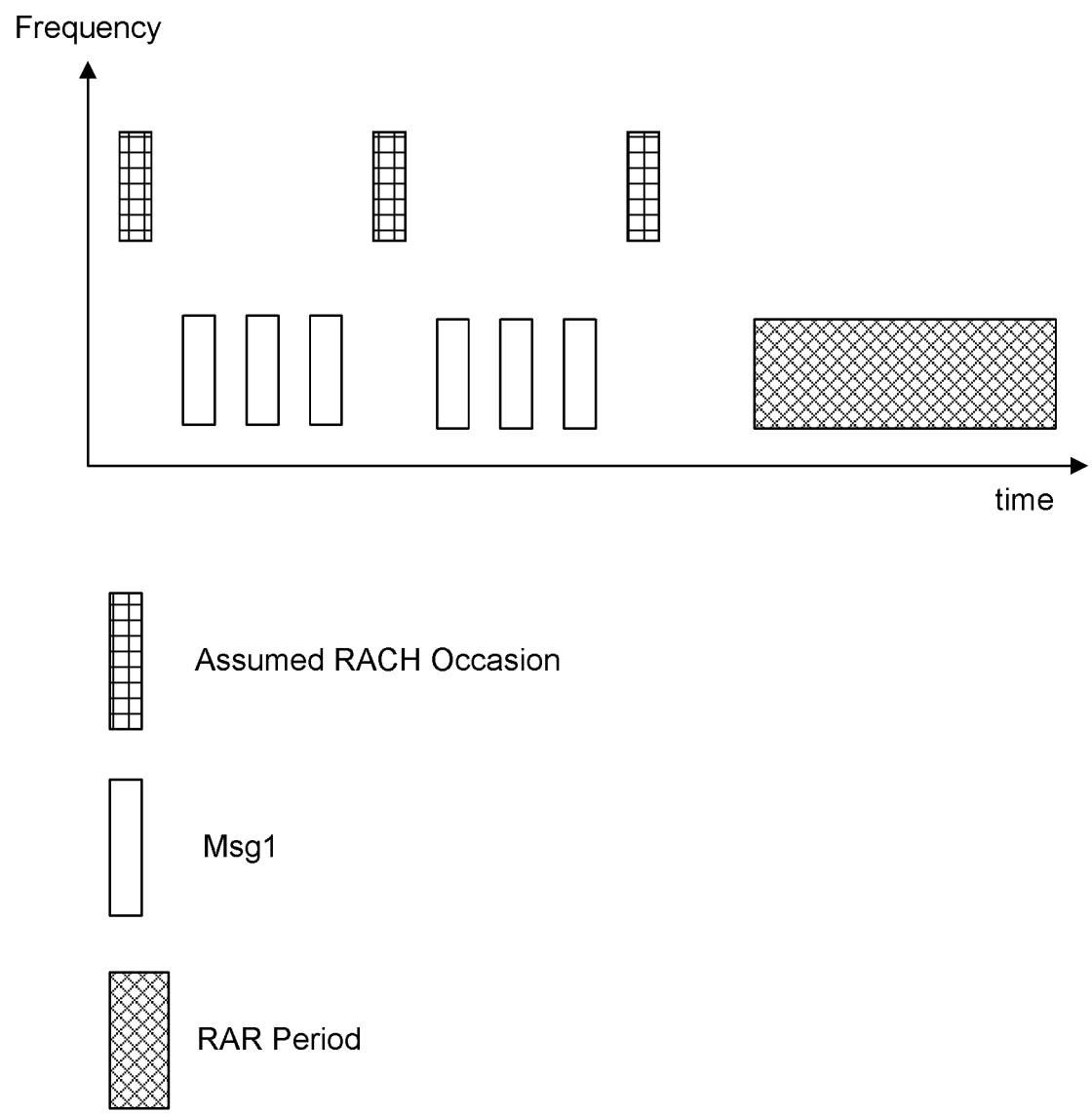
FIG. 11 is a system resource diagram illustrating an example of multiple Msg1 transmissions before a random access response (RAR).

In an embodiment, the WTRU may transmit one Msg1 in one PRACH occasion if it can estimate the transmission delay accurately. The transmission delay may be obtained by using GNSS information. Alternatively, for example, as shown in FIG. 11, the WTRU may transmit several Msg1s before one PRACH occasion and over multiple PRACH occasions if the transmission delay is not accurately estimated by the WTRU.

In an embodiment, the WTRU may determine whether to perform a 2-step RACH procedure or a 4-step RACH procedure based on any of whether the WTRU is a GNSS-based WTRU, the satellite type that may be targeted and/or accessed, a minimum delay of the transmission, a maximum delay of the transmission, a QoS of data, a priority level of the WTRU, a number of available PRACH sequences, a configuration of the PRACH, a Doppler compensation capability, and Msg3 size.

In an embodiment, assuming it is equipped with a GNSS receiver and appropriate processing, the WTRU may perform a 2-step RACH procedure if it can determine the timing of the PRACH occasion and data accurately. In an embodiment, the WTRU may perform a 4-step RACH procedure if it cannot estimate transmission delay accurately. Forgoing the use of 2-step RACH procedure if the WTRU cannot estimate transmission delay accurately may increase a probability of success of the 2-step RACH procedure since it may avert conditions in which the WTRU does not have an accurate timing for data transmission and, in turn, the network not being able to receive and/or decode the transmitted data accurately.

In an embodiment, the WTRU may perform a 2-step RACH procedure if it is a high priority WTRU and/or if it has high QoS data in its data buffer. In an embodiment, the WTRU may perform a 4-step RACH procedure if it is a low priority WTRU and/or if it has low QoS data in its buffer. Forgoing the use of the 2-step RACH procedure if the WTRU is a low priority WTRU and/or if the WTRU has low QoS data in its buffer may allow for prioritization of high priority WTRUs in accessing the network and avoidance of the low priority WTRUs using data resource dedicated to high priority WTRUs during the initial access procedure.

In an embodiment, the WTRU may perform both 2-step and 4-step RACH procedures before monitoring for a RAR. For example, the WTRU may perform both 2-step and 4-step RACH procedure by sending one Msg1 and one MsgA, where Msg1 is in a RACH occasion following a 4-step RACH configuration and MsgA is sent in a RACH occasion following a 2-step RACH configuration. The WTRU may determine to perform both 2-step and 4-step RACH procedure based on any of whether the WTRU is GNSS-based WTRU, a minimum delay of the transmission, maximum delay of the transmission, QoS of data, a priority level of the WTRU, a number of available PRACH sequences, a configuration of PRACH, a Doppler compensation capability, and Msg3 size In an embodiment, a WTRU may determine a RACH configuration for transmitting any of various messages, such as, for example, MsgA. In an embodiment, the WTRU may be configured with various parameters from which to select for the RACH configuration for transmitting MsgA. Such parameters may include, for example, any of a preamble index, a resource for preamble transmission, a number of preamble transmissions, a resource for PUSCH in MsgA, a number of PUSCH transmissions, a redundancy version (RV) sequence, an association between a preamble and a PUSCH, a transmission power (e.g., maximum transmit power, calculated transmit power, etc.) of a PUSCH, and/or a modulation and/or coding scheme (MCS) of a PUSCH.

In an embodiment, the WTRU many select any of the various parameters based on one or a combination of factors. Such factors may include, for example, any of a type of WTRU; a class of WTRU; whether the WTRU is equipped with GNSS capabilities; the WTRU having a capability of estimating TA, position etc. (e.g., whether the particular capability exists and/or is sufficient to yield an accurate estimation); a Doppler compensation capability; a size (e.g., number of bits) of MsgA; an estimated TA; and a predicted TA.

In an embodiment, the WTRU may determine the number of PUSCHs and/or the number preamble transmissions based on the estimated TA and/or accuracy of the estimated TA. As an example, the WTRU may determine to use (and use) one preamble and one or more PUSCH transmissions based on (e.g., conditioned on) the WTRU having the capability to, and/or be able to, estimate TA accurately. As another example, the WTRU may determine to use (and use) one preamble with multiple PUSCH transmissions based on (e.g., conditioned on) the WTRU not having the capability to, and/or not being able to, estimate TA accurately. As another example, the WTRU may determine to use (and use) multiple preambles with one PUSCH based on (e.g., conditioned on) the WTRU not having the capability to, and/or not being able to, estimate TA accurately. As yet another example, the WTRU may determine to use (and use) multiple transmissions of both preamble and PUSCH based on (e.g., conditioned on) the WTRU not having the capability to, and/or not being able to, estimate TA accurately.

Although the parameters and factors in the foregoing examples refer to the number of preambles and/or PUSCH transmissions along with the estimated TA, the WTRU may determine the RACH configuration for transmitting MsgA using parameters and factors other than the number of preambles, the number of PUSCH transmissions and the estimated TA. For example, the WTRU may determine the MCS of the PUSCH based on the estimated TA. The WTRU may determine to use a relatively small MCS index in the MCS table if the estimated TA is relatively large and it may determine to use a relatively large MCS index if the estimated TA is relatively small. As another example, the WTRU may determine the transmission power of PUSCH based on the estimated TA. The WTRU, for instance, may determine to use a relatively higher power if its estimated TA is relatively high and it may determine to use a relatively low power if its estimated TA is relatively low.

In an embodiment, the WTRU may indicate (or report) its estimated TA to the network. The WTRU, for example, may inform the network of the estimated TA using MsgA. Informing the network of the estimated TA may provide various benefits, including, for example, an ability to support a gNB in scheduling a HARQ ACK/NACK for MsgB and/or in scenarios that MsgA is not decoded successfully.

The WTRU may explicitly and/or implicitly inform the network of the estimated TA. In an embodiment, the WTRU may include the estimated TA in a PUSCH of MsgA. Alternatively, the WTRU may include, in the PUSCH of MsgA, an index to a table of estimated TAs. The index may refer to, for example, one or more ranges of estimated TAs among multiple ranges in the table. In an embodiment, the WTRU may implicitly inform the network of its estimated TA by using a particular parameter or a combination of particular parameters for MsgA. For example, the WTRU may use a certain preamble index (a certain preamble resource, etc.), where the preamble index (preamble resource, etc.) is associated to a range of estimated TAs. As another example, the WTRU may use a combination of a preamble index and preamble resource, where the combination of the preamble index and the preamble resource is associated to a range of estimated TAs.

Although the parameters in the foregoing examples refer to preamble index and preamble resource, the WTRU may implicitly inform the network of its estimated TA using parameters other than and/or in addition to preamble index and preamble resource. For example, the WTRU may implicitly inform the network of its estimated TA using the selected preamble format, preamble root sequence, preamble cyclic prefix, etc.

In an embodiment, a WTRU may determine one or a combination of various transmission properties to use for transmission and/or retransmission of MsgA. Some or all of the transmission properties may be based on a receive status of MsgB. The receive status of MsgB may be any of the following statuses:

No MsgB (e.g., WTRU doe not receive a PDCCH (scrambled by RA-RNTI) within the MsgB window);

MsgB Decoding Failure (e.g., WTRU successfully decodes a PDCCH scrambled by RA-RNTI in MsgB window, but fails to decode corresponding PDSCH);

MsgB indicates ACK for preamble and NACK for PUSCH;

MsgB indicates NACK for preamble and ACK for PUSCH; and

MsgB indicates ACK for both preamble and PUSCH.

The various transmission properties available for the WTRU to use may include any of performing power ramping for a preamble, adjusting (e.g., increasing/decreasing) transmission power, adjusting MCS (e.g., to decrease/increase data rate) for PUSCH, switching from 2-step RACH to 4-step RACH (e.g., transmit preamble only), adjusting (e.g., increasing/decreasing) the number of PUSCH transmissions, adjusting (e.g., Increasing/decreasing) the number of preamble transmissions, adjusting the estimated TA value, using another resource configuration for MsgA, selecting a particular preamble format; and using or switching to another (e.g., different) preamble format.

As an example, the WTRU may increase the number of PUSCH and/or preamble transmissions based on (or condition on) not receiving MsgB ("No MsgB" status) and/or failing to decode MsgB ("MsgB Decoding Failure" status). Increasing the number of PUSCH and/or preamble transmissions may provide various benefits, including, for example, enhancing reception probability of MsgA. Alternatively, the WTRU may use a different preamble format and/or use a different resource configuration for preamble transmission in MsgA.

As disclosed hereinabove, a WTRU may initiate initial access procedure by sending Msg1 (e.g., a RACH preamble) to the network. In an embodiment, a WTRU may determine a transmit power, TxP, for Msg1, for example, based (at least in part) on various satellite information received from the network. The satellite information may include any of a preamble received target power information element (IE); a power ramping step IE; a satellite transmit power ("Sat Tx Power") IE; a satellite type IE; an altitude IE; a speed IE and ephemeris data IE.

The preamble received target power IE may specify a receive target power (e.g., in dB) for each of one or more satellites. The power ramping step IE may specify, for each of one or more satellites, one or more power ramping steps (e.g., each having a power (e.g., in dB) with a sign to indicate to increase or decrease by the specified power).

The Sat Tx Power IE may specify, for each of one or more satellites, a power (e.g., in dB) for each of various signals transmitted from the concerned satellite. The various signals may include reference signals, such as a synchronization signal.

The satellite type IE may specify one or more satellite types, such as, for example, geostationary orbit (GEO), medium earth orbit (MEO), low earth orbit (LEO), high-altitude pseudo-satellite (HAPS), etc. The altitude IE may specify, for each of one or more satellites, one or more altitudes of the concerned satellite. The altitudes may include, for example, a current altitude, a past altitude, a future altitude. The altitude IE may include different precisions values for some or all of the specified altitudes.

The speed IE may specify, for each of one or more satellites, one or more speeds of the concerned satellite. Each speed may be specified as a speed with respect to Earth. The speeds may include, for example, a current speed, a past speed, a future speed. The speed IE may include different precisions values for some or all of the specified speeds.

The ephemeris data IE may specify, for each of one or more satellites, one or more ephemeris data of the concerned satellite. The ephemeris data may include, for example, ephemeris data received from the concerned satellite and/or long-term ephemeris data. The ephemeris data IE may include different precisions values for some or all of the specified ephemeris data.

The satellite information may be sent by the network, and received by the WTRU, in any of layer 1 (L1), layer 2 (L2), and layer 3 (L3) signaling (e.g., one or more information elements (IEs) thereof). For example, the satellite information may be sent by the network, and received by the WTRU, in system information in a dedicated SIB (or other IE) or in any of the MIB and/or one or more SIBs. As an example, the preamble received target power IE and the power ramping step IE may be sent by the network, and received by the WTRU, in SIB2, whereas the satellite type, altitude; speed and ephemeris data IEs may be sent by the network, and received by the WTRU, in the MIB and one or more other SIBs.

In an embodiment, the WTRU may determine a receive power based on a reference signal. The determined received power may be, for example, a reference signal received power (RSRP). For simplicity of exposition, the following assumes the measured reference signal is a synchronization signal and the determined received power is a RSRP of the synchronization signal (herein "SS-RSRP").

In an embodiment, the WTRU may estimate pathloss (PL) based on (e.g., as a function of) the Sat Tx Power IE and the SS-RSRP, such as, for example, by:

$$PL = \text{Sat } Tx \text{ Power} - \text{SS-RSRP} \quad (4)$$

The estimated PL may be valid at a time, t1, corresponding to when synchronization signal is measured in connection with determining the SS-RSRP. However, due to mobility, satellite speed (especially for LEO satellites and the like) and other factors, the estimated PL might not reflect (e.g., accurately reflect) the PL between the WTRU and the satellite at a time, t2, when Msg1 is intended to and/or expected to arrive at the satellite. Using a PL that reflects the PL between the WTRU and the satellite at a time, t2, may result in the transmit power, TxP, for Msg1 being set appropriately and may avoid unnecessary retransmission of Msg1 and/or other WTRU's transmission (e.g., due to the transmit power, TxP, for Msg1 causing interference).

In an embodiment, the WTRU may predict a PL ("predicted PL") at time, t2, based on (e.g., using and/or a function of) any of a calculated distance to the concerned satellite at time, t1, the estimated PL at time, t1, and a predicted distance to the satellite at time. t2. For example, the predicted PL may be based on a ratio of the calculated and predicted distances as applied to the estimated PL. In an embodiment, the WTRU may calculate its distance from the satellite at time, t1, based on the satellite information, such as, for example, the satellite altitude and ephemeris data IEs. The WTRU may predict its distance from the satellite at time, t2, based on (e.g., using) information, such as trajectory of the WTRU, the satellite altitude IE, the speed IE and the ephemeris data IE.

In an embodiment, the WTRU may calculate two transmit powers, TxP1, TxP2. The first and second transmit powers, TxP1, TxP2, for example, may be based on the estimated PL and the predicted PL, respectively. The first and second transmit powers, TxP1, TxP2, may be calculated, for example, as follows:

$$TxP1(t1)=\text{preamble received target power}+PL(t1), \text{ and} \quad (5)$$

$$TxP2(t2)=\text{preamble received target power}+PL(t2). \quad (6)$$

where the preamble received target power may be obtained from the satellite information, PL(t1) may be (or based on) the estimated PL, and PL(t2) may be (or based on) the predicted PL.

In an embodiment, the WTRU may determine the transmit power, TxP, for Msg1 based on the first and second transmit powers, TxP1, TxP2. For example, the transmit power, TxP, for Msg1 may be a maximum of the first and second transmit powers, TxP1, TxP2. Alternatively, the transmit power, TxP, for Msg1 may be the average or other function of the first and second transmit powers, TxP1, TxP2.

In an embodiment, the WTRU may set and/or apply the transmit power, TxP, for Msg1 according to the following:

$$TxP=\min(\text{Max Power}, f(TxP1(t1), TxP2(t2))), \quad (7)$$

where Max Power may be a maximum transmit power; TxP1(t1) may be (or be based on) the first transmit power, TxP1; TxP2(t2) may be (or be based on) the first transmit power, TxP1; and $f$ (TxP1(t1), TxP2(t2)) refers to some function applied to TxP1(t1) and/or TxP2(t2). The Max Power may be a configured maximum transmit power (e.g., configured using any of L1, L2, L3 signaling) and/or may be based on WTRU class.

If an initial attempt for transmission of Msg1 fails (e.g., no response from the satellite within the RAR window), the WTRU may modify (e.g., increase) the first transmit power, TxP1, in accordance with the power ramping step IE. Alternatively and/or additionally, the WTRU may determine a third transmit power, TxP3, for retransmitting Msg1 based on a second predicted PL between the WTRU and the satellite at a time, t3, when Msg1 is intended to and/or expected to arrive at the satellite after retransmission. The WTRU, for example, may predict the second predicted PL at time, t3, based on (e.g., using and/or a function of) any of a calculated distance to the concerned satellite at time, t1, the estimated PL at time, t1, and a predicted distance to the satellite at time. t3. The WTRU may use equation 6 to determine the transmit power, TxP3, except that PL(t2) is replaced with PL(t3), where PL(t3) may be (or based on) the second predicted PL. For the Msg1 retransmission, the WTRU may set and/or apply the TxPower for Msg1 according to:

$$TxP=\min(\text{Max Power}, f(TxP(t1)+\text{power ramping step}, TxP3(t3))). \quad (8)$$

where Max Power may be the maximum transmit power; TxP1(t1) may be (or be based on) the first transmit power, TxP1; TxP3(t3) may be (or be based on) the third transmit power, TxP3; and $f$ (TxP1(t1)+power ramping step, TxP2(t2)) refers to some function applied to TxP1(t1)+power ramping step and/or TxP2(t2). The Max Power may be a configured maximum transmit power (e.g., configured using any of L1, L2, L3 signaling) and/or may be based on WTRU class.

Although the foregoing embodiments are described with respect to Msg1 transmission and/or retransmission, such embodiments are equally applicable to and may be carried accordingly for preamble transmissions and/or retransmissions.

In an embodiment, a WTRU may determine a synchronization raster (or which of a number of synchronization rasters) to use. The determination may be based on a satellite type the WTRU is targeting and/or accessing. In an embodiment, the WTRU may be configured with a one or more synchronization rasters. Each (or any) of the synchronization rasters may be associated with one or more types of satellites. The WTRU may determine which of the configured synchronization rasters to use based on the satellite type it is targeting. In an embodiment, the WTRU may be configured with a large synchronization raster for a LEO satellite and a smaller (as compared to a LEO satellite) synchronization raster for a GEO satellite. Configuring a large synchronization raster for a LEO satellite may reduce the number of SSB frequency locations (e.g., to account for a high Doppler shift of the LEO satellite) for the WTRU to access the satellite.

In an embodiment, a WTRU may determine SSB timing of a plurality of beams transmitted by a satellite, for example, based on timing of one SSB and a timing pattern (e.g., (pre-)defined timing pattern) among the beams. In an embodiment, a satellite may (pre-) configure a predefined timing pattern of a plurality of beams in the satellite. Based on the SSB timing of different beams, the WTRU may determine a time at which to monitor different frequencies to detect an SSB from a beam in a satellite.

In an embodiment, a WTRU may monitor a group common PDCCH (GC-PDCCH) and may receive an indication of a timing advance (TA) command (TAC) for itself and/or for a group of WTRUs ("group TAC").

In an embodiment, the WTRU may monitor a GC-PDCCH for a group TAC and may adjust its timing advance to that of the group TAC. In an embodiment, the WTRU may be configured with a GC-RNTI and a CORSET to monitor for the group TAC for a group of WTRUs.

In an embodiment, the WTRU may adjust its TA autonomously. The WTRU, for example, may determine (e.g., estimate) its TA autonomously based on any of timing of control and/or data sent from the network, ephemeris of a satellite and GNSS information. The WTRU, for example, may receive a TA change rate in the ephemeris to adjust its TA. Alternatively, the WTRU may estimate the TA based on a position of the WTRU obtained from GNSS information. In an embodiment, a WTRU may indicate its TA estimation capability to the network. In an embodiment, the UE may indicate its capability of TA adjustment to the network. The TA estimation capability and/or the capability of TA adjustment may be sent to the network in a WTRU (e.g., UE) capability message.

In an embodiment, a WTRU may determine a TAC mode to use based on information from the network (e.g., information provided by a gNB). In an embodiment, a gNB and/or the network may support one or more TAC modes for the WTRU. Each (or any) of the TAC modes may indicate reference timing for the TAC. The TAC modes may include an autonomous mode and non-autonomous mode. In the autonomous mode, the WTRU may be able to measure the TA and in the non-autonomous mode, the WTRU may not be able to measure the TA by itself. In the autonomous mode, the WTRU may change the TA, for example, based on the reference timing from its previous UL transmission, a previous successful transmission and the like. In the non-autonomous mode, the WTRU may change the TA, for example, based on the reference timing from a previous TAC.

The WTRU may be informed of its TAC mode in any of L1, L2 and L3 signaling. For example, the WTRU may be informed of the TAC mode dynamically in each TAC message. Alternatively, the WTRU may semi-statically configure which TAC mode it can use based on any of a MAC CE and an RRC message.

CONCLUSION

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU 102, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the representative embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (e.g., but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only and is not intended to be limiting. Further, it is to be understood that the headings used herein are used to aid in understanding of the various disclosed embodiments and are not intended to be limiting.

As used herein, when referred to herein, the terms "station" and its abbreviation "STA", "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any UE recited herein, are provided below with respect to FIGS. 1A-1D.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, § 6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

Throughout the disclosure, one of skill understands that certain representative embodiments may be used in the alternative or in combination with other representative embodiments.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WRTU, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits.

The data bits may also be maintained on a computer readable medium including magnetic disks, optical disks, and any other volatile (e.g., Random Access Memory ("RAM")) or non-volatile ("e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method implemented in a wireless transmit/receive unit (WTRU), the method comprising:
   receiving, from a network element of a network including a non-terrestrial network, differential delay information and physical random access channel (PRACH) configuration information indicating a plurality of preambles and a PRACH occasion configuration;
   determining a set of candidate PRACH occasions, from among a plurality of PRACH occasions of the PRACH occasion configuration, based on the differential delay information;
   selecting a preamble from a group of preambles of the plurality of preambles, wherein the group of preambles is allocated to one candidate PRACH occasion of the set of candidate PRACH occasions; and
   transmitting the selected preamble using a PRACH resource corresponding to the one candidate PRACH occasion.

2. The method of claim 1, wherein the differential delay information comprises a maximum delay difference.

3. The method of claim 1, comprising:
   determining a delay difference period based on the differential delay information, wherein determining the set of candidate PRACH occasions comprises:
   determining, from among the plurality of PRACH occasions of the PRACH occasion configuration, the set of candidate PRACH occasions that are within one delay difference period.

4. The method of claim 3, comprising determining a number of groups of preambles of the plurality of preambles based on a number of PRACH resources within the delay difference period.

5. The method of claim 1, comprising:
   allocating the group of preambles to the one candidate PRACH occasion.

6. The method of claim 1, comprising one of:
   allocating the group of preambles to the one candidate PRACH occasion based on a rule, wherein the rule specifies that one partition of the plurality of preambles is to be allocated; and
   allocating the group of preambles to the one candidate PRACH occasion based on a configured mapping.

7. The method of claim 1, comprising:
   selecting the one candidate PRACH occasion from among the set of candidate PRACH occasions.

8. The method of claim 1, comprising one of:
   determining the one candidate PRACH occasion from among the set of candidate PRACH occasions based on the group of the preambles allocated to one candidate PRACH occasion including a preamble having a particular characteristic;
   determining the one candidate PRACH occasion from among the set of candidate PRACH occasions based on the group of preambles allocated to one candidate PRACH occasion lacking a preamble having the particular characteristic; and
   determining the one candidate PRACH occasion from among the set of candidate PRACH occasions based on the group of preambles allocated to one candidate PRACH occasion corresponding to a range of timing advances between the WTRU and the network.

9. The method of claim 1, comprising selecting at least one frequency resource to transmit the selected preamble.

10. The method of claim 9, wherein transmitting the selected preamble using a PRACH resource comprises transmitting the selected preamble based on frequency hopping configured by the network.

11. A wireless transmit/receive unit (WTRU) comprising circuitry, including any of a transmitter, receiver, processor and memory, configured to:
    receive, from a network element of a network including a non-terrestrial network, differential delay information and physical random access channel (PRACH) configuration information indicating a plurality of preambles and a PRACH occasion configuration;
    determine a set of candidate PRACH occasions, from among a plurality of PRACH occasions of the PRACH occasion configuration, based on the differential delay information;
    select a preamble from a group of preambles of the plurality of preambles, wherein the group of preambles is allocated to one candidate PRACH occasion of the set of candidate PRACH occasions; and
    transmit the selected preamble using a PRACH resource corresponding to the one candidate PRACH occasion.

12. The WTRU of claim 11, wherein the differential delay information comprises a maximum delay difference.

13. The WTRU of claim 11, wherein the circuitry is configured to:
    determine a delay difference period based on the differential delay information, wherein the circuitry being configured to determine the set of candidate PRACH occasions comprises the circuitry being configured to:

determine, from among the plurality of PRACH occasions of the PRACH occasion configuration, the set of candidate PRACH occasions that are within one delay difference period.

14. The WTRU of claim 13, wherein the circuitry is configured to determine a number of groups of preambles of the plurality of preambles based on a number of PRACH resources within the delay difference period.

15. The WTRU of claim 11, wherein the circuitry is configured to:
allocate the group of preambles to the one candidate PRACH occasion.

16. The WTRU of claim 11, wherein the circuitry is configured to allocate the group of preambles to the one candidate PRACH occasion based on at least one of:
a rule, wherein the rule specifies that one partition of the plurality of preambles is to be allocated; and
a configured mapping.

17. The WTRU of claim 11, wherein the circuitry is configured to:
select the one candidate PRACH occasion from among the set of candidate PRACH occasions.

18. The WTRU of claim 11, wherein the circuitry is configured to determine the one candidate PRACH occasion from among the set of candidate PRACH occasions based on one of:
the group of preambles allocated to one candidate PRACH occasion including a preamble having a particular characteristic;
the group of preambles allocated to one candidate PRACH occasion lacking a preamble having the particular characteristic; and
the group of preambles allocated to one candidate PRACH occasion corresponding to a range of timing advances between the WTRU and the network.

19. The WTRU of claim 11, wherein the circuitry is configured to select at least one frequency resource to transmit the selected preamble.

20. The WTRU of claim 19, wherein the circuitry being configured to transmit the selected preamble using a PRACH resource comprises the circuitry being configured to transmit the selected preamble based on frequency hopping configured by the network.

* * * * *